(12) United States Patent
Uzawa et al.

(10) Patent No.: US 11,329,749 B2
(45) Date of Patent: May 10, 2022

(54) BANDWIDTH ALLOCATION DEVICE AND BANDWIDTH ALLOCATION METHOD

(71) Applicant: NIPPON TELEGRAPH AND TELEPHONE CORPORATION, Tokyo (JP)

(72) Inventors: Hiroyuki Uzawa, Yokosuka (JP); Tatsuya Shimada, Yokosuka (JP); Daisuke Hisano, Yokosuka (JP); Hiroko Nomura, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 150 days.

(21) Appl. No.: 16/483,715

(22) PCT Filed: Feb. 6, 2018

(86) PCT No.: PCT/JP2018/004046
§ 371 (c)(1),
(2) Date: Aug. 5, 2019

(87) PCT Pub. No.: WO2018/147285
PCT Pub. Date: Aug. 16, 2018

(65) Prior Publication Data
US 2020/0028605 A1    Jan. 23, 2020

(30) Foreign Application Priority Data

Feb. 10, 2017 (JP) .............................. JP2017-023365

(51) Int. Cl.
*H04J 3/16* (2006.01)
*H04W 72/04* (2009.01)
*H04W 72/12* (2009.01)

(52) U.S. Cl.
CPC .......... *H04J 3/1682* (2013.01); *H04J 3/1605* (2013.01); *H04W 72/0446* (2013.01); *H04W 72/0453* (2013.01); *H04W 72/12* (2013.01)

(58) Field of Classification Search
CPC . H04J 3/1605; H04J 3/1682; H04W 72/0446; H04W 72/0453; H04W 72/12
See application file for complete search history.

(56) References Cited

U.S. PATENT DOCUMENTS

2007/0019957 A1    1/2007 Kim et al.
2009/0202249 A1    8/2009 Ogushi
(Continued)

FOREIGN PATENT DOCUMENTS

EP    3567810 A1    11/2019
JP    2017-011547 A    1/2017
(Continued)

OTHER PUBLICATIONS

Japanese Notice of Allowance from counterpart JP2018567443, dated Jan. 14, 2020.
(Continued)

*Primary Examiner* — Rhonda L Murphy
(74) *Attorney, Agent, or Firm* — Harness, Dickey & Pierce, P.L.C.

(57) ABSTRACT

A bandwidth allocation device is included in a communication system having a terminal station device and a terminal device and relaying upstream data, which is received from a communication terminal by a lower device connected to the terminal device, to an upper device connected to the terminal station device. The bandwidth allocation device includes a transmission-permitted period start position determining unit configured to estimate a start position of an arrival period in which the upstream data arrives at the terminal device from the lower device; a transmission-
(Continued)

permitted period length determining unit configured to estimate a length of the arrival period based on an amount of upstream data to be transmitted from the lower device to the terminal device; and a bandwidth allocation unit configured to allocate a bandwidth to the terminal device based on the estimated start position and the estimated length of the arrival period.

10 Claims, 15 Drawing Sheets

(56) References Cited

U.S. PATENT DOCUMENTS

| | | | |
|---|---|---|---|
| 2012/0033963 A1* | 2/2012 | Nose | H04L 12/2898 398/1 |
| 2013/0077633 A1* | 3/2013 | Mizutani | H04J 3/1694 370/400 |
| 2015/0311980 A1 | 10/2015 | Kuwano et al. | |

FOREIGN PATENT DOCUMENTS

| | | |
|---|---|---|
| JP | 2017-022456 A | 1/2017 |
| JP | 2017017498 A | 1/2017 |

OTHER PUBLICATIONS

T. Tashiro, et.al., A Novel DBA Scheme for TDM-PON based Mobile Fronthaul, OFC 2014, Tu3F.3, 2014.

T. Kobayashi et. al., Bandwidth Allocation scheme based on Simple Statistical Traffic Analysis for TDM-PON based Mobile Fronthaul, OFC 2016, W3C.7, 2016.

Shimada et al., A study on functions and requirements of optical-mobile cooperative IF toward low latency TDM-PON system, IEICE Technical Report, vol. 116, No. 293, p. 7-12, 2016.

International Search Report (English and Japanese) issued in International Application No. PCT/JP2018/004046, dated May 1, 2018; ISA/JP.

\* cited by examiner

| Cycle No. | 0 | 1 | ... | 14 | 15 | 16 | 17 | 18 | 19 | 20 | ... | $N_{grant}-1$ |
|---|---|---|---|---|---|---|---|---|---|---|---|---|
| DETECTION NUMBER | 0 | 0 | | 0 | 2 | 18 | 12 | 7 | 4 | 0 | | 0 |

PRIOR ART

… (1) …

BANDWIDTH ALLOCATION DEVICE AND BANDWIDTH ALLOCATION METHOD

CROSS-REFERENCE TO RELATED APPLICATIONS

This application is a 371 U.S. National Phase of International Application No. PCT/JP2018/004046, filed on Feb. 6, 2018, which claims priority to Japanese Application No. 2017-023365, filed on Feb. 10, 2017. The entire disclosures of the above applications are incorporated herein by reference.

TECHNICAL FIELD

The present invention relates to a bandwidth allocation device and a bandwidth allocation method.

BACKGROUND ART

In the time division multiplexing-passive optical network (TDM-PON) such as next generation-passive optical network 2 (NG-PON2), terminal device (an optical network unit (ONU)) receives upstream data from a lower device and also transmits a signal (hereinafter referred to as "required transmission amount notification") representing bandwidth information (a required transmission amount) necessary to transmit the upstream data to terminal station device (an optical line terminal (OLT)). After receiving required transmission amounts from all ONUs through required transmission amount notifications, the OLT determines a bandwidth allocation amount (hereinafter referred to as "allocation amount") for each ONU on the basis of the corresponding required transmission amount and transmits a signal for providing a notification of the allocation result (hereinafter referred to as "transmission allocation amount notification signal") to each ONU. Each ONU transmits upstream data which can be transmitted in a transmission bandwidth designated by the transmission allocation amount notification signal on the basis of a designated allocation amount.

Due to this allocation control, after ONUs notify the OLT of required transmission amounts for upstream data received from lower devices, allocation amounts for upstream data transmission to the ONUs are determined by the OLT, and each ONU is notified of an allocation amount. Because of such control, it takes time to transmit upstream data, which causes a delay (hereinafter referred to as "control delay"). This control delay becomes a bottleneck in low-latency transmission which is required when a mobile wireless communication system is accommodated in a TDM-PON system. So far, the following two methods have been disclosed to reduce the corresponding control delay.

One method is to reduce control delay in cooperation with an upper device (e.g., see Non-Patent Document 1). In a mobile wireless communication system, an upper device performs scheduling at every transmission time interval (TTI) so that the upper device may centrally control upstream transmission from a user terminal which is wirelessly connected to a lower device. The scheduling results are transmitted to each user terminal, and each user terminal performs upstream transmission on the basis of the corresponding scheduling result. Hereinafter, upstream user data transmitted from a user terminal is also referred to as "mobile data." According to the method of Non-Patent Document 1, an OLT receives in advance, from an upper device, wireless resource information including information for specifying at least the amount of upstream user data received from each user terminal by a lower device (hereinafter referred to as "mobile data amount") and the reception time (hereinafter referred to as "mobile data receiving time") among the scheduling results. The OLT determines an allocation amount for each ONU on the basis of the corresponding information and notifies each ONU of the corresponding allocation amount. In this way, the OLT can determine an allocation amount without waiting for a required transmission amount notification from each ONU, and thus control delay can be reduced.

The other method is to statistically determine the allocation amount (e.g., see Non-Patent Document 2). According to this method, an OLT monitors the amount of upstream data (traffic amount) transmitted from each ONU and determines an allocation amount for each ONU on the basis of a statistical value of monitoring results. For this reason, like in Non-Patent Document 1, the OLT becomes able to determine an allocation amount without waiting for receiving a required transmission amount notification from each ONU, and thus control delay can be reduced.

CITATION LIST

Non Patent Literature

[Non-Patent Document 1]
T. Tashiro, et al., "A Novel DBA Scheme for TDM-PON based Mobile Fronthaul," OFC 2014, Tu3F.3, 2014

[Non-Patent Document 2]
T. Kobayashi, et al., "Bandwidth Allocation scheme based on Simple Statistical Traffic Analysis for TDM-PON based Mobile Fronthaul," OFC 2016, W3C.7, 2016

SUMMARY OF INVENTION

Technical Problem

In a prior art, FIG. 18A and FIG. 18B are diagrams showing a relationship between a transmission-permitted period for an ONU and an arrival period of mobile data. The transmission-permitted period is a period in which an ONU is permitted to transmit upstream data. In an ideal state shown in FIG. 18A, a period in which mobile data arrives at an ONU (hereinafter referred to as "mobile data arrival period") is included in a transmission-permitted period allocated to the ONU in the TTI. However, a processing latency in a lower device and a gap between pieces of mobile data are not included in either of wireless resource information of Non-Patent Document 1 or a statistical value of Non-Patent Document 2. For this reason, sometimes, it is not possible to include an entire mobile data arrival period in a transmission-permitted period. This means that there is mobile data which cannot be transmitted by an ONU in the TTI as shown in an unideal state of FIG. 18B.

In consideration of the above circumstances, an object of the present invention is to provide a bandwidth allocation device and a bandwidth allocation method for reducing the amount of upstream data which cannot be transmitted from terminal device to terminal station device in one data transmission interval.

Solution to Problem

According to a first aspect of the present invention, a bandwidth allocation device allocates a bandwidth to at least one terminal device in a communication system including a terminal station device and the at least one terminal device and relaying upstream data, which is received from a communication terminal by a lower device connected to the at least one terminal device, to an upper device connected to the terminal station device. The bandwidth allocation device includes a transmission-permitted period start position determining unit configured to estimate a start position of an arrival period in which the upstream data arrives at the at least one terminal device from the lower device, a transmission-permitted period length determining unit configured to estimate the length of the arrival period on the basis of a data amount of upstream data that can be transmitted from the lower device to the at least one terminal device, and a bandwidth allocation unit configured to allocate a bandwidth to the at least one terminal device on the basis of the estimated start position and the estimated length of the arrival period.

According to a second aspect of the present invention, the above-described bandwidth allocation device of the first aspect further includes a cooperative processing unit configured to acquire radio resource information indicating radio resources allocated to the communication terminal for wireless communication with the lower device from the upper device and calculate an arrival start time where the upstream data begins to arrive at the lower device on the basis of the radio resource information. The transmission-permitted period start position determining unit is configured to treat a time obtained by adding at least a time spent for internal processing in the lower device to the arrival start time as an estimated time of the start position.

According to a third aspect of the present invention, the above-described bandwidth allocation device of the first aspect further includes a traffic monitoring unit configured to monitor the traffic amount of upstream data received from the at least one terminal device at the terminal station device. The transmission-permitted period start position determining unit is configured to detect-a time at which the amount of upstream user data received from the at least one terminal device begins to exceed a threshold value in each autonomous interval having a same length as a transmission time interval of the upstream data from the lower device to the upper device and is configured to treat a time obtained by adding a time difference between a start time in the autonomous interval and the detected time in the autonomous interval to the start time in each autonomous interval at the terminal station device as an estimated time of the start position.

According to a fourth aspect of the present invention, in the above-described bandwidth allocation device of the first aspect, the transmission-permitted period length determining unit is configured to treat a value obtained by multiplying a predetermined length of the period and a value obtained by dividing the amount of upstream data to be transmitted from the lower device by a minimum arrival amount, which is a minimum arrivable amount of upstream data from the lower device in a predetermined period, as an estimated value of the length of the arrival period.

According to a fifth aspect of the present invention, in the above-described bandwidth allocation device of the fourth aspect, the transmission-permitted period length determining unit is configured to treat a value obtained by multiplying a value obtained by dividing the predetermined length of the period by a maximum length of the arrival period and an transmittable amount of upstream data in the maximum length of the arrival period as the minimum arrival amount.

According to a sixth aspect of the present invention, in the above-described bandwidth allocation device of the fourth aspect, when a value obtained by multiplying the predetermined length of the period and a value obtained by dividing an amount of upstream data to be transmitted from the lower device by the minimum arrival amount exceeds a length of a transmission time interval of the upstream data from the lower device to the upper device, the transmission-permitted period length determining unit is configured to treat the length of the transmission time interval as the estimated value of the arrival period.

According to a seventh aspect of the present invention, in the above-described bandwidth allocation device of the first aspect, the bandwidth allocation unit is configured to equally distribute a bandwidth available in a period in which the at least one terminal device has the arrival period to the at least one terminal device having the arrival period in the period and is configured to equally distribute a bandwidth available in a period in which any of the at least one terminal device does not have the arrival period to all of the at least one terminal device in the period.

According to an eighth aspect of the present invention, the above-described bandwidth allocation device of the first aspect further includes a control parameter estimation unit configured to determine whether the at least one terminal device has upstream data to be transmitted to the upper device at each allocation cycle obtained by dividing a transmission time interval of the upstream data from the lower device to the upper device and estimate a processing latency in the lower device on the basis of a start time of an allocation cycle in which it is determined a largest number of times that upstream data to be transmitted to the upper device is present and a time at which the lower device receives the upstream data from the communication terminal. The transmission-permitted period start position determining unit is configured to calculate an estimated time of the start position on the basis of the processing latency estimated by the control parameter estimation unit and the time at which the lower device receives the upstream data from the communication terminal.

According to a ninth aspect of the present invention, the above-described bandwidth allocation device of the first aspect further includes a control parameter estimation unit configured to acquire an amount of upstream data to be transmitted to the upper device from the at least one terminal device at each allocation cycle obtained by dividing a transmission time interval of the upstream data from the lower device to the upper device and estimate a minimum arrival amount, which is a minimum amount of upstream data to be arrived at the at least one terminal device in an allocation cycle, on the basis of a difference in the amount of upstream data between allocation cycles. The transmission-permitted period length determining unit is configured to treat a value obtained by multiplying a length of an allocation cycle and a value obtained by dividing an amount of upstream data transmitted from the lower device to the at least one terminal device by the minimum arrival amount as an estimated value of the length of the arrival period.

According to a tenth aspect of the present invention, in the above-described bandwidth allocation device of the eighth aspect, the control parameter estimation unit is configured to recursively divide allocation cycles in the transmission time interval into a first half allocation cycle and a second half allocation cycle, the control parameter estimation unit is configured to estimate a number of burst frames in the upstream data on the basis of a number of times of division of the transmission time interval performed until a certain difference or more is detected between an amount of upstream data transmitted in the first half allocation cycle and an amount of upstream data transmitted in the second half allocation cycle, and the transmission-permitted period start position determining unit is configured to calculate an estimated time of the start position on the basis of the processing latency and the number of burst frames estimated by the control parameter estimation unit and the time at which the lower device receives the upstream data from the communication terminal.

According to an aspect of the present invention, a bandwidth allocation method executed by a bandwidth allocation device which is configured to allocate a bandwidth to at least one terminal device in a communication system including a terminal station device and the at least one terminal device and relaying upstream data, which is received from a communication terminal by a lower device connected to the at least one terminal device, to an upper device connected to the terminal station device includes a transmission-permitted period start position determining step in which a transmission-permitted period start position determining unit estimates a start position of an arrival period in which the upstream data arrives at the at least one terminal device from the lower device, a transmission-permitted period length determining step in which a transmission-permitted period length determining unit estimates a length of the arrival period on the basis of a data amount of upstream data that can be transmitted from the lower device to the at least one terminal device, and a bandwidth allocation step in which a bandwidth allocation unit allocates a bandwidth to the at least one terminal device on the basis of the estimated start position and the estimated length of the arrival period.

Advantageous Effects of Invention

According to the present invention, it is possible to reduce the amount of upstream data that cannot be transmitted from terminal device to terminal station device in one data transmission time interval.

DESCRIPTION OF EMBODIMENTS

Figure 1:
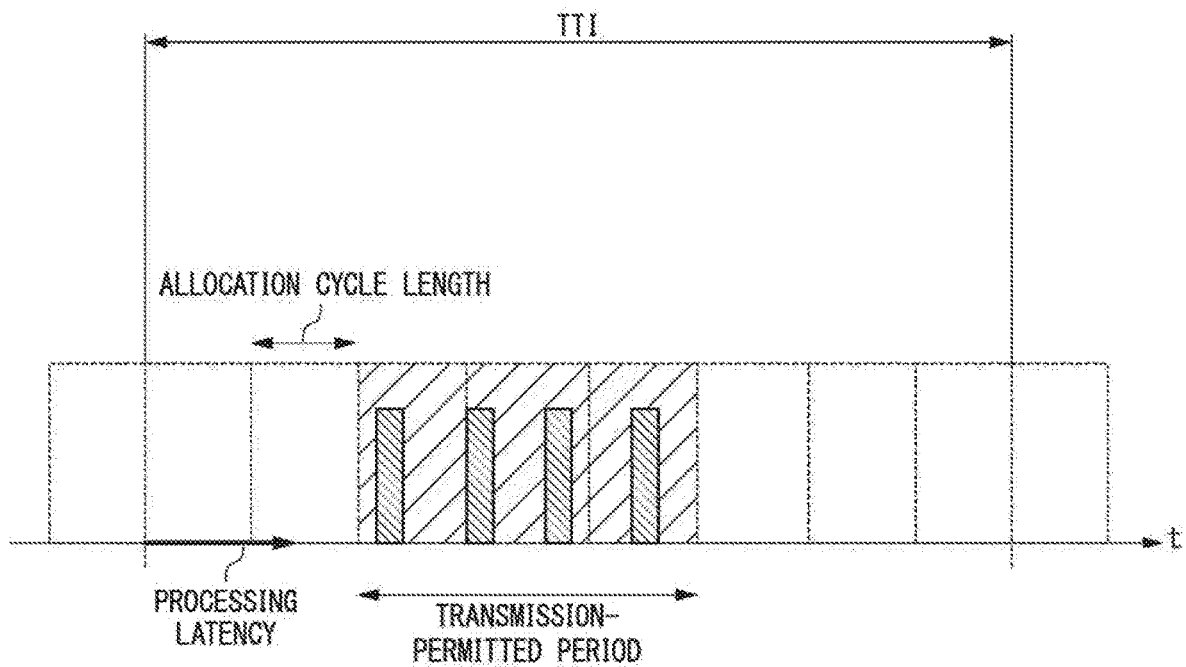
FIG. 1 is a diagram showing an example of a transmission-permitted period according to a first embodiment of the present invention.

Hereinafter, embodiments of the present invention will be described in detail with reference to the drawings.

An example in which a relay system which relays communication of a mobile wireless communication system is a passive optical network (PON) will be described below. In a PON system, an optical line terminal (OLT) corresponds to terminal station device, and an optical network unit (ONU) corresponds to terminal device. The OLT is connected to a plurality of ONUs, and the plurality of ONUs transmit upstream data to the OLT by time-division multiple access (TDMA). The OLT operates as a bandwidth allocation device which allocates a transmission-permitted period start position and a bandwidth amount of upstream data to the ONUs. The transmission-permitted period indicates a period in which an ONU is permitted to transmit upstream data, and the transmission-permitted period start position indicates the timing at which the transmission-permitted period begins.

The mobile wireless communication system includes an upper device, lower devices, and a user terminal. The user terminal is a communication terminal that wirelessly communicates with the lower devices. In the case of downstream communication, the upper device transmits downstream user data, which is downstream data addressed to the user terminal, to the OLT, and the OLT broadcasts the downstream user data to subordinate ONUs. Each ONU extracts downstream user data addressed to a subordinate lower device from the broadcast downstream user data and transmits the extracted downstream user data to the lower device. The lower device wirelessly transmits the downstream user data to the user terminal. In the case of upstream communication, a lower device transmits mobile data, which is upstream user data wirelessly received from the user terminal, to an ONU, and the ONU transmits the mobile data received from the lower device to the OLT according to a bandwidth allocation amount (hereinafter referred to as "allocation amount") designated by the OLT. The OLT transmits the received mobile data to the upper device.

An OLT of the present embodiment estimates a start position and a length of a mobile data arrival period at every TTI of ONUs and determines a transmission-permitted period start position and a length of a transmission-permitted period of upstream data for each ONU on the basis of the estimation results. The OLT determines an allocation amount of each ONU on the basis of the determined transmission-permitted period start position and length of transmission-permitted period and notifies each ONU of the determined allocation amount.

[Pre-Determination]

First, an allocation cycle length and a minimum arrival amount are determined in advance. An allocation cycle is a minimum unit of a period treated as a bandwidth allocation target by an OLT, and the allocation cycle length is a length (period) of one allocation cycle. The minimum arrival amount is a minimum value of the amount of data that can arrive at an ONU in the allocation cycle.

The allocation cycle length is a value obtained by dividing a TTI length into a plurality of segments, and a value of (the allocation cycle length×a division number) coincides with the TTI length. Also, the minimum arrival amount is the amount of mobile data which arrives at the ONU per allocation cycle under the condition that a mobile data arrival period, which is a period in which mobile data arrives at the ONU, becomes the longest. When the amount of data that can be transmitted in the mobile data arrival period is D, the minimum arrival amount is a value obtained by multiplying the data amount D and a value obtained by dividing the allocation cycle length by the mobile data arrival period length. That is, the minimum arrival amount is obtained by (data amount D×(allocation cycle length)/(mobile data arrival period length)). Also, when the minimum arrival amount is greater than a value A obtained by dividing the maximum amount of data that can be transmitted in the allocation cycle length by the number of ONUs, the obtained value A may be the minimum arrival amount.

In the following descriptions and drawings, a case in which the division number is 8 is shown as an example, but the division number is not limited thereto.

[Overview of all Processing]

In the present embodiment, an OLT separately performs a process of estimating a start position of a mobile data arrival period regarding an ONU and determining the estimated start position as a transmission-permitted period start position of upstream data regarding the ONU and a process of estimating a length of the mobile data arrival period regarding the ONU and determining the estimated length as a length of a transmission-permitted period for the ONU.

FIG. 1 is a diagram showing an example of a transmission-permitted period. In the process of determining a transmission-permitted period start position, as shown in FIG. 1, an OLT estimates a start position of a mobile data arrival period regarding an ONU by adding a processing latency of a lower device to a mobile data receiving time or a start time of a TTI regarding the ONU as an offset. The estimated start position becomes a transmission-permitted period start position. Here, a mobile data receiving time regarding a lower device subordinate to the ONU may be used as the mobile data receiving time regarding the ONU. Also, a time obtained by additionally adding a value in which a transmission delay is taken into consideration and the like to the mobile data receiving time regarding the lower device may be treated as a mobile data receiving time.

In the process of determining a length of a transmission-permitted period, the OLT determines a transmission-permitted period on the basis of a minimum arrival amount which is the minimum amount of mobile data that can arrive at the ONU in an allocation cycle. Specifically, the transmission-permitted period is the period of the number of allocation cycles equal to a value obtained by dividing a mobile data amount specified by radio resource information or a statistical process described in a prior art by the minimum arrival amount (mobile data amount/minimum arrival amount×allocation cycle length).

Since the transmission-permitted period is obtained by using the minimum amount basis as described above, it is possible to avoid a lack of a transmission-permitted period even when the gap between pieces of mobile data is large and a mobile data arrival period is long. As a result, the transmission-permitted period can include the entire arrival period of upstream user data. Also, since a length of the transmission-permitted period is adaptively changed according to the amount of mobile data, bandwidth allocation can be optimized, and excessive bandwidth allocation is not continued.

First Embodiment

[OLT Configuration]

Figure 2:
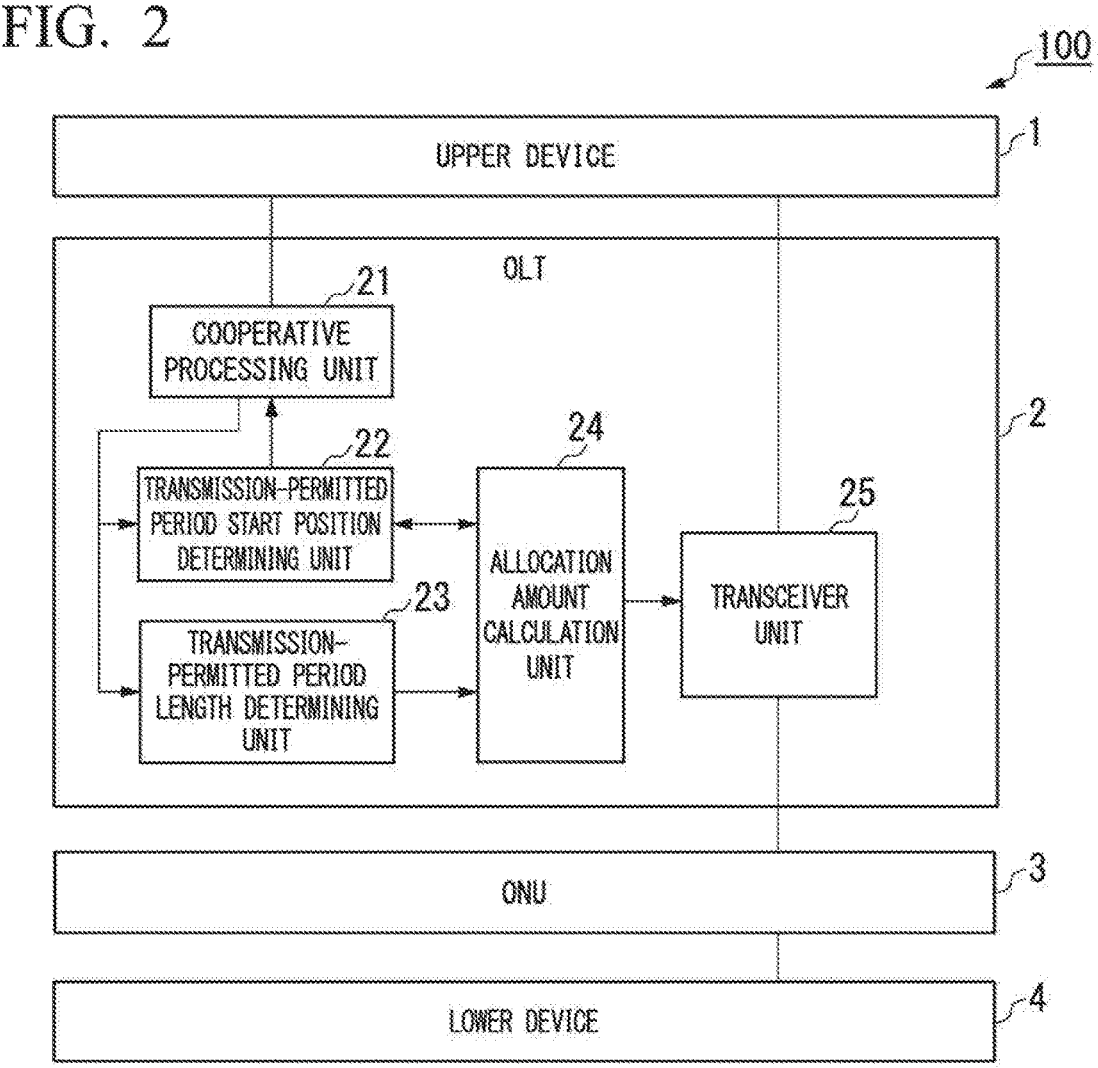
FIG. 2 is a functional block diagram of a communication system according to the first embodiment.

A first embodiment of the present invention will be described on the basis of the above description. FIG. 2 is a functional block diagram of a communication system 100 according to the first embodiment. The communication system 100 includes an upper device 1, an OLT 2, an ONU 3, and a lower device 4. FIG. 2 shows one each of the upper device 1, the ONU 3, and the lower device 4, but the communication system 100 can include a plurality of each. The number of ONUs 3 connected to the OLT 2 is referred to as a connected ONU number.

The OLT 2 includes a cooperative processing unit 21, a transmission-permitted period start position determining unit 22, a transmission-permitted period length determining unit 23, an allocation amount calculation unit 24, and a transceiver unit 25. The cooperative processing unit 21 receives radio resource information from the upper device 1 and specifies a mobile data receiving time and a mobile data amount regarding the ONU 3 on the basis of the received radio resource information. The cooperative processing unit 21 can perform this processing by using the technology of Non-Patent Document 1. The radio resource information shows allocation of radio resources to each user terminal, and it is possible to acquire the amount of mobile data that the lower device 4 receives from each user terminal and a mobile data receiving time of each piece of the mobile data on the basis of the allocated radio resources. The cooperative processing unit 21 calculates a mobile data receiving time and a mobile data amount in each ONU 3 on the basis of the mobile data receiving time and the mobile data amount of a lower device 4 subordinate to the ONU 3.

The transmission-permitted period start position determining unit 22 determines a transmission-permitted period start position of the ONU 3 on the basis of the mobile data receiving time regarding the ONU 3. The transmission-permitted period length determining unit 23 determines a transmission-permitted period length for each ONU 3 on the basis of the mobile data amount of the ONU 3. The allocation amount calculation unit 24 determines an allocation amount of each ONU 3 on the basis of the transmission-permitted period start position determined by the transmission-permitted period start position determining unit 22 and the transmission-permitted period length determined by the transmission-permitted period length determining unit 23 regarding each ONU 3. The transceiver unit 25 converts an electrical signal representing downstream data received from the upper device 1 into an optical signal and transmits the optical signal to the ONU 3. The transceiver unit 25 converts an optical signal representing upstream data received from an ONU 3 into an electrical signal and transmits the electrical signal to the upper device 1. Also, the transceiver unit 25 notifies the ONU 3 of the allocation amount of each allocation cycle. The process of the transceiver unit 25 is the same as that of a prior art.

In FIG. 2, the cooperative processing unit 21, the transmission-permitted period start position determining unit 22, the transmission-permitted period length determining unit 23, and the allocation amount calculation unit 24 are provided in the OLT 2, but all or some of them can be provided in a bandwidth allocation device which is an external device of the OLT 2.

Details of the transmission-permitted period start position determining unit 22, the transmission-permitted period length determining unit 23, and the allocation amount calculation unit 24 will be described below.

[Details of Transmission-Permitted Period Start Position Determining Unit 22]

When a start time of an allocation cycle treated as a bandwidth allocation target is received from the allocation amount calculation unit 24, the transmission-permitted period start position determining unit 22 calculates a time by adding a processing latency of the lower device 4 as an offset to a mobile data receiving time in the ONU 3 obtained on the basis of the radio resource information. The transmission-permitted period start position determining unit 22 acquires a time earlier than the start time of the allocation cycle among calculated times from the cooperative processing unit 21 and outputs the acquired time to the allocation amount calculation unit 24 as a transmission-permitted period start position. In other words, the radio resource information which is treated as an acquisition target from the cooperative processing unit 21 satisfies Equation (1) below.

[Math. 1]

$$\text{Time}[i]+T_{latency} \leq T_{alloc\_start} \Leftrightarrow \text{Time}[i] \leq T_{alloc\_start} - T_{latency} \quad (1)$$

In Equation (1), Time[i] is a mobile data receiving time regarding ONU #i which is an $i^{th}$ ONU 3. $T_{latency}$ is a processing latency spent for internal processing in the lower device 4, and $T_{alloc\_start}$ is a start time of an allocation cycle treated as a bandwidth allocation target. The transmission-permitted period start position determining unit 22 treats a time obtained by subtracting the processing latency $T_{latency}$ from the start time $T_{alloc\_start}$ as a basis so that Equation (1) is satisfied. The transmission-permitted period start position determining unit 22 acquires radio resource information indicating the mobile data receiving time Time[i] earlier than the value, which is treated as the basis, from the cooperative processing unit 21. Accordingly, the value acquired from the radio resource information (the mobile data receiving time Time[i]) is a value before addition of the processing latency. Therefore, the transmission-permitted period start position determining unit 22 outputs, as a transmission-permitted period start position of ONU #i, a time obtained by adding the processing latency $T_{latency}$ to a value of the mobile data receiving time Time[i] of ONU #i acquired from the radio resource information.

The processing latency $T_{latency}$ may be determined in advance on the basis of a time spent for internal processing in each lower device 4. The transmission-permitted period start position determining unit 22 may determine the start time $T_{alloc\_start}$ on the basis of a delay (round trip time (RTT)) dependent on a transmission distance between the OLT 2 and the ONU 3. In this case, the transmission-permitted period start position determining unit 22 determines the start time $T_{alloc\_start}$ on the basis of Equation (2) instead of Equation (1). In Equation (2), $T_{delay}$ represents a delay time dependent on the transmission distance.

[Math. 2]

$$\text{Time}[i]+T_{latency}+T_{delay} \leq T_{alloc\_start} \Leftrightarrow \text{Time}[i] \leq T_{alloc\_start} - T_{latency} - T_{delay} \quad (2)$$

The transmission-permitted period length determining unit 23 is also notified of the radio resource information read from the cooperative processing unit 21, and the radio resource information is eliminated from the cooperative processing unit 21.

[Details of Transmission-Permitted Period Length Determining Unit 23]

The transmission-permitted period length determining unit 23 acquires a mobile data amount of each ONU 3 from the radio resource information read from the cooperative processing unit 21 according to an instruction from the transmission-permitted period start position determining unit 22 and calculates a transmission-permitted period length. An equation for calculating a transmission-permitted period length is given as Equation (3).

[Math. 3]

$$N_{cycle}[i] = \min\left(N_{grant}, \left\lceil \frac{DataSize[i]}{D_{min}} \right\rceil\right) \quad (3)$$

In Equation (3), DataSize[i] is a mobile data amount of ONU #i, $N_{cycle}[i]$ is the number of allocation cycles treated as a transmission-permitted period for ONU #i, $D_{min}$ is a minimum arrival amount, and $N_{grant}$ is a division number of a TTI length (the number of allocation cycles per TTI). The mobile data amount DataSize[i] that can arrive at ONU #i is calculated on the basis of the sum of mobile data amounts in the lower device 4 subordinate to ONU #i. The mobile data amount DataSize[i] represents the amount of mobile data to be transmitted from ONU #i to the OLT 2. When $N_{cycle}[i]$ exceeds $N_{grant}$, the transmission-permitted period length determining unit 23 treats a value of the number of allocation cycles $N_{cycle}[i]$ as the division number $N_{grant}$ of the TTI length. That is, when a mobile data amount exceeds the amount of data that can be transmitted in one TTI, a transmission-permitted period is determined to be the TTI length.

The transmission-permitted period length determining unit 23 outputs $N_{cycle}[i]$ of each ONU #i to the allocation amount calculation unit 24 as a transmission-permitted period length.

[Details of Allocation Amount Calculation Unit 24]

The allocation amount calculation unit 24 equally distributes a bandwidth available in an allocation cycle among ONUs 3 whose transmission-permitted periods are included in the allocation cycle treated as a bandwidth allocation target. Meanwhile, when a transmission-permitted period is not included in an allocation cycle treated as a bandwidth allocation target by all of ONUs 3, a bandwidth in the allocation cycle is equally distributed among all of the ONUs 3. The allocation amount calculation unit 24 performs this processing at each allocation cycle treated as a bandwidth allocation target.

Figure 3:
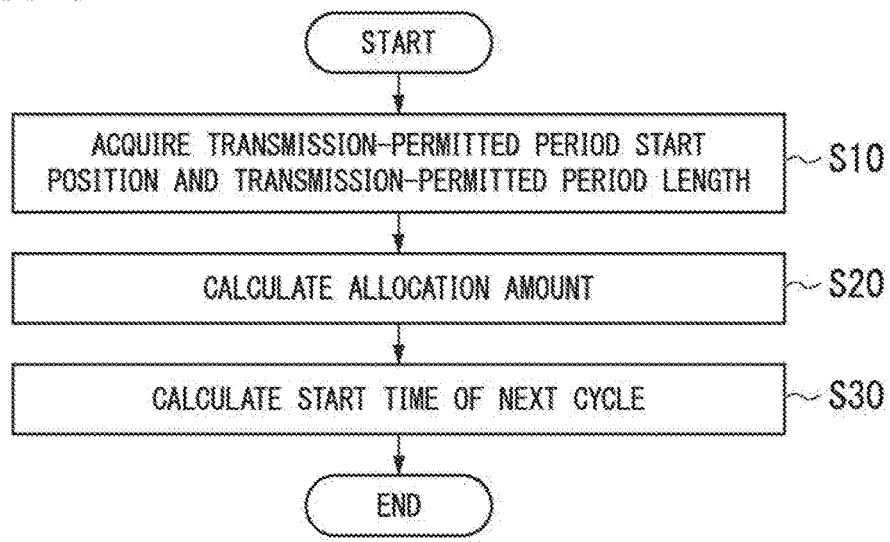
FIG. 3 is a flowchart showing a bandwidth allocation process of an allocation amount calculation unit according to the first embodiment.

FIG. 3 is a flowchart showing a bandwidth allocation process of the allocation amount calculation unit 24. The allocation amount calculation unit 24 performs the flow shown in FIG. 3 from the beginning to the end every time an allocation cycle treated as a bandwidth allocation target is changed. First, the allocation amount calculation unit 24 acquires a transmission-permitted period start position of each ONU 3 updated on the basis of a start time of the allocation cycle by the transmission-permitted period start position determining unit 22. Also, the allocation amount calculation unit 24 acquires a transmission-permitted period for each ONU 3 from the transmission-permitted period length determining unit 23 (step S10). The allocation amount calculation unit 24 calculates an allocation amount of each ONU 3 on the basis of an updated transmission-permitted period length for each ONU 3 (step S20). The allocation amount calculation unit 24 calculates a start time of the next allocation cycle (step S30).

Figure 4:
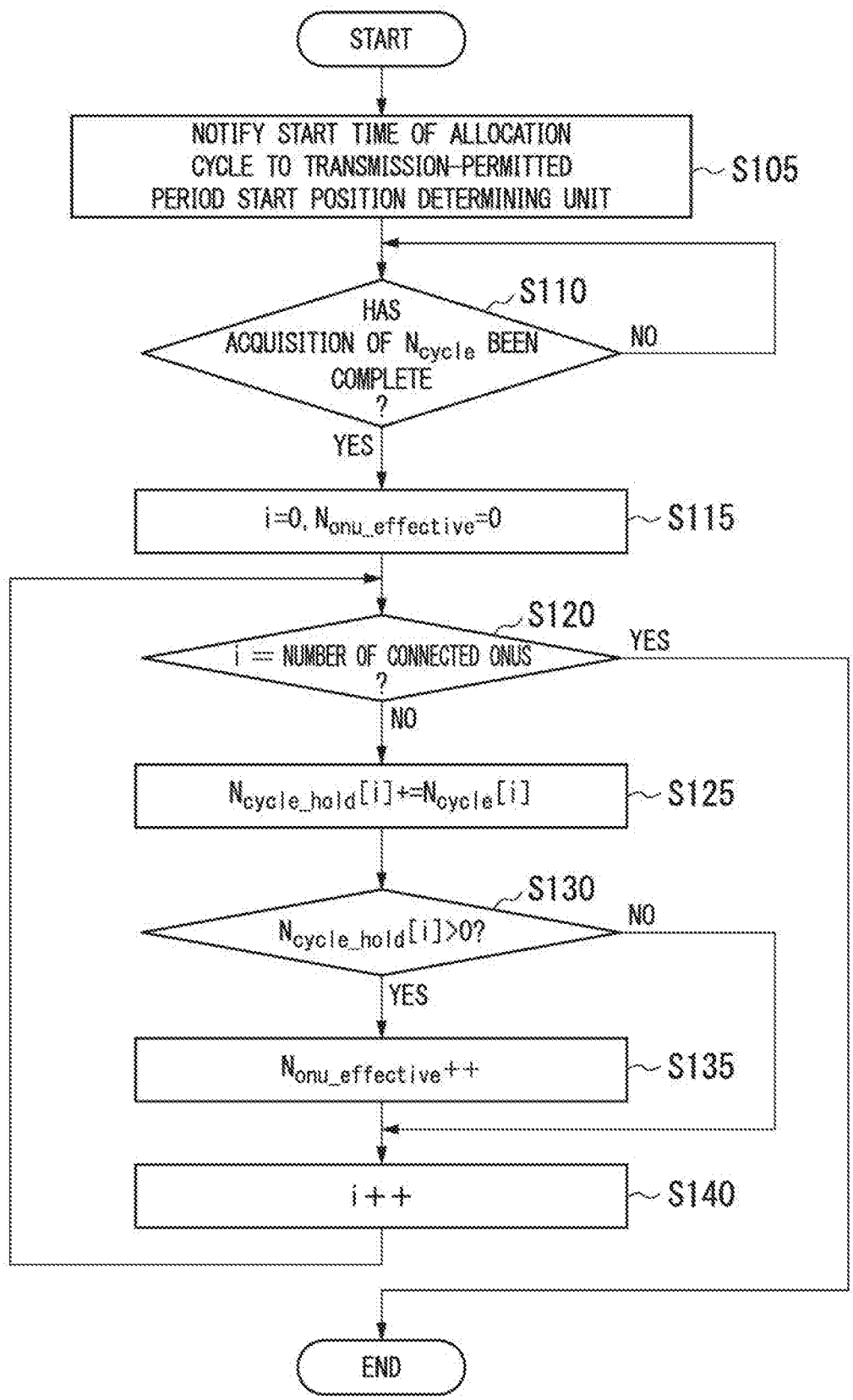
FIG. 4 is a flowchart showing a transmission-permitted period start position and transmission-permitted period length update process of the allocation amount calculation unit according to the first embodiment.

FIG. 4 is a flowchart showing a transmission-permitted period start position and transmission-permitted period length update process in step S10 of FIG. 3. The allocation amount calculation unit 24 notifies the transmission-permitted period start position determining unit 22 of a start time of an allocation cycle treated as a bandwidth allocation target and acquires a transmission-permitted period start position and a transmission-permitted period length from the transmission-permitted period start position determining unit 22 and the transmission-permitted period length determining unit 23, respectively.

Specifically, the allocation amount calculation unit 24 notifies the transmission-permitted period start position determining unit 22 of a start time $T_{alloc\_start}$ of the allocation cycle treated as the bandwidth allocation target (step S105). The cooperative processing unit 21 calculates a mobile data receiving time and a mobile data amount of each lower device 4 on the basis of radio resource information and calculates a mobile data receiving time and a mobile data amount of each ONU 3 on the basis of mobile data receiving times and mobile data amounts of each lower device 4 subordinate to the ONU 3. The transmission-permitted period start position determining unit 22 acquires ONU #j (j is an integer greater than or equal to 1 and smaller than or equal to a connected ONU number) whose mobile data receiving time Time[j] is ahead of a time obtained by subtracting the processing latency $T_{latency}$ from the start time $T_{alloc\_start}$ with reference to a mobile data receiving time of each ONU 3 calculated by the cooperative processing unit 21.

The transmission-permitted period start position determining unit 22 calculates a transmission-permitted period start position by adding the processing latency $T_{latency}$ to the acquired mobile data receiving time Time[j] of ONU #j and notifies the allocation amount calculation unit 24 of the transmission-permitted period start position. The transmission-permitted period start position determining unit 22 instructs the transmission-permitted period length determining unit 23 to calculate a transmission-permitted period length $N_{cycle}[j]$ of ONU #j. The transmission-permitted period length determining unit 23 calculates the transmission-permitted period length $N_{cycle}[j]$ of ONU #j as instructed by the transmission-permitted period start position determining unit 22 through Equation (3) by using a mobile data amount DataSize[j] of ONU #j calculated by the cooperative processing unit 21. The transmission-permitted period length determining unit 23 notifies the allocation amount calculation unit 24 of the calculated number of allocation cycles $N_{cycle}[j]$ of ONU #j. When the allocation amount calculation unit 24 acquires transmission-permitted period lengths $N_{cycle}[j]$ of all ONU #j (step S110), the allocation amount calculation unit 24 performs processing from step S115 onward.

In step S115 to step S140, when a transmission-permitted period start position and a transmission-permitted period length of each ONU 3 are acquired, the allocation amount calculation unit 24 adds an acquired transmission-permitted period to a transmission-permitted period holding value for each ONU 3. At this time, the number of ONUs 3 whose transmission-permitted period holding values are not 0 in a current allocation cycle (the number of ONUs whose transmission-permitted periods overlap) is measured as an effective ONU number $N_{onu\_effective}$.

Specifically, the allocation amount calculation unit 24 initializes a variable i and the effective ONU number $N_{onu\_effective}$ by setting them to 0 (step S115). The allocation amount calculation unit 24 determines whether the variable i has reached the connected ONU number (step S120). When it is determined that the variable i has not reached the connected ONU number, the allocation amount calculation unit 24 adds a transmission-permitted period length $N_{cycle}[i]$ to a current transmission-permitted period holding value $N_{cycle\_hold}[i]$ of ONU #i (step S125). When it is determined that the transmission-permitted period holding value $N_{cycle\_hold}[i]$ is greater than 0, the allocation amount calculation unit 24 adds 1 to a value of the currently effective ONU number $N_{onu\_effective}$ (step S135). After it is determined in step S130 that the transmission-permitted period holding value $N_{cycle\_hold}[i]$ is smaller than or equal to 0, or after the processing of step S135, the allocation amount calculation unit 24 adds 1 to a current value of the variable i (step S140) and repeats the processing from step S120. When it is determined that the variable i has reached the connected ONU number, the allocation amount calculation unit 24 finishes the processing of FIG. 4.

Figure 5:
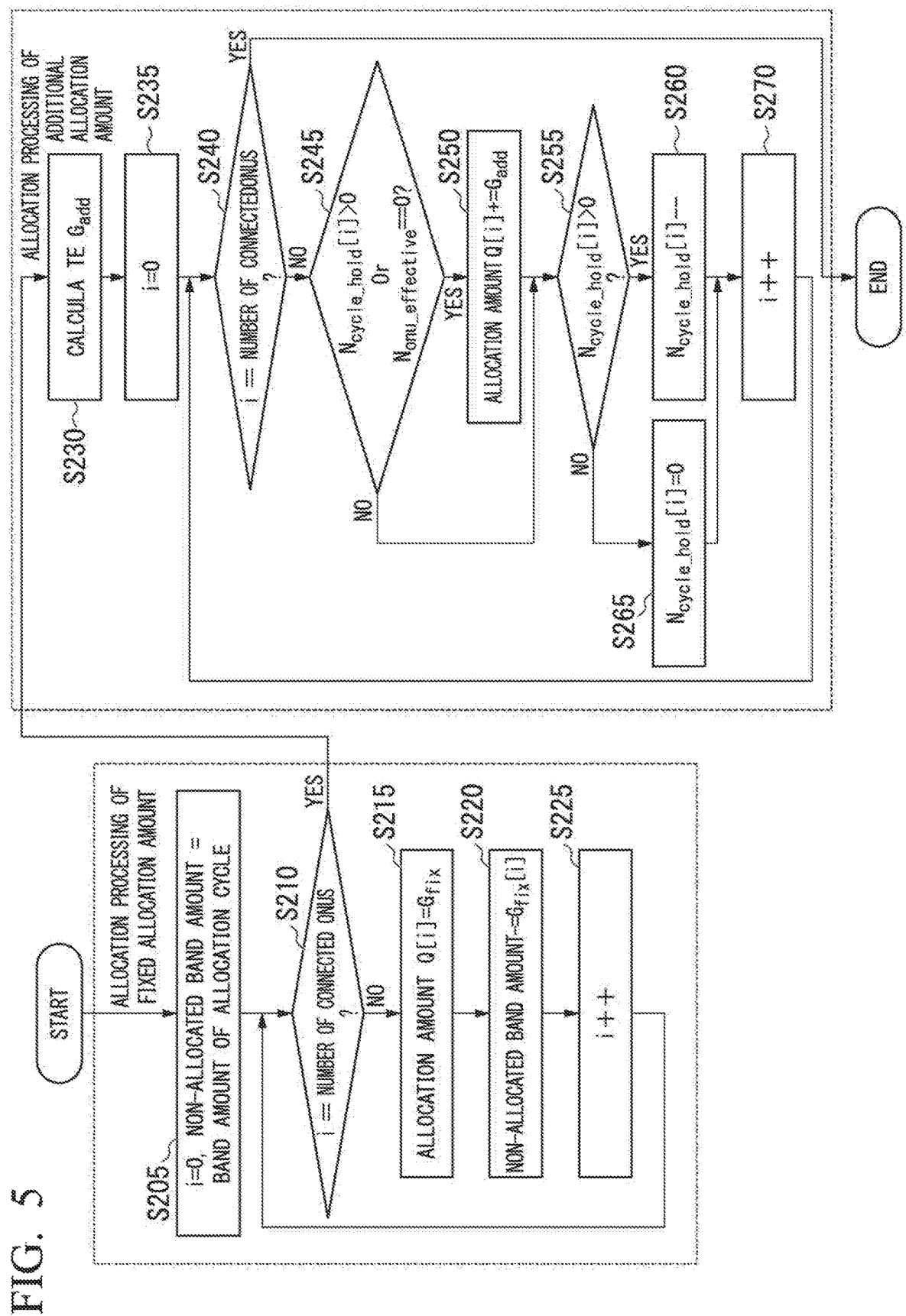
FIG. 5 is a flowchart showing an allocation amount calculation process of the allocation amount calculation unit according to the first embodiment.

FIG. 5 is a flowchart showing allocation amount calculation processing in step S20 of FIG. 3.

Following the processing of FIG. 4, the allocation amount calculation unit 24 calculates an allocation amount of each ONU 3 in an allocation cycle of an allocation target. The relevant calculation includes two steps of initially allocating a bandwidth part fixedly allocated to all the ONUs 3 regardless of whether the relevant allocation cycle is a transmission-permitted period (fixed allocation processing) and then additionally allocating a remaining bandwidth to each ONU 3 adaptively according to whether the relevant allocation cycle is a transmission-permitted period (additional allocation processing).

In the fixed allocation processing of step S205 to step S225, the allocation amount calculation unit 24 allocates a bandwidth, which is fixedly allocated at each allocation cycle (a fixed allocation amount $G_{fix}$), to all the ONUs 3 connected to the OLT 2 as an allocation amount. For example, the fixed allocation amount is the amount of data corresponding to a bandwidth required to transmit a control signal which is sent between an upper device 1 and a lower device 4. An overhead amount and the like for burst transmission may be added to this fixed allocation amount on the basis of rules of an allocation amount notification method in a TDM-PON.

Specifically, the allocation amount calculation unit 24 initializes the variable i by setting it to 0 and initializes a non-allocated bandwidth amount by setting it to a bandwidth amount which is available in an allocation cycle (step S205). The allocation amount calculation unit 24 determines whether the variable i has reached a connected ONU number (step S210). When it is determined that the variable i has not reached the connected ONU number, the allocation amount calculation unit 24 treats an allocation amount Q[i] of ONU #i as the fixed allocation amount $G_{fix}$ (step S215). The allocation amount calculation unit 24 updates the non-allocated bandwidth amount with a value obtained by subtracting the fixed allocation amount $G_{fix}$ from the non-allocated bandwidth amount (step S220). The allocation amount calculation unit 24 adds 1 to the current value of the variable i (step S225) and repeats the processing from step S210. When it is determined that the variable i has reached the connected ONU number, the allocation amount calculation unit 24 performs additional allocation processing from step S230.

In the additional allocation processing of step S230 to step S270, the allocation amount calculation unit 24 equally distributes a bandwidth which has not been allocated in an allocation cycle after the fixed allocation processing to ONUs 3 whose transmission-permitted period holding values $N_{cycle\_hold}[i]$ calculated in step S10 are not 0. An allocation amount corresponding to this equally distributed bandwidth (an additional allocation amount $G_{add}$) is given by Equation (4).

$$G_{add} \begin{cases} \left\lfloor \dfrac{G_{effective}}{N_{onu\_effective}} \right\rfloor & \text{if, } N_{onu\_effective} > 0 \\ \left\lfloor \dfrac{G_{effective}}{N_{onu}} \right\rfloor, & \text{otherwise} \end{cases} \quad (4)$$

In Equation (4), $G_{effective}$ is a value obtained by extracting only a bandwidth that can be used to transmit user data in the non-allocated bandwidth. For example, $G_{effective}$ is a value that can be obtained by excluding a bandwidth of parity bits for error correction. $N_{onu\_effective}$ is the effective ONU number calculated in step S10, and $N_{onu}$ is the connected ONU number, that is, the total number of ONUs 3 which are in connection with the OLT 2. When the effective ONU number is 0, the allocation amount calculation unit 24 adds the additional allocation amount $G_{add}$ to an allocation amount of all of the ONUs 3. When the effective ONU number is not 0, the allocation amount calculation unit 24 adds the additional allocation amount $G_{add}$ to an allocation amount of only ONUs 3 whose transmission-permitted period holding values are not 0 and decreases the transmission-permitted period holding values.

Specifically, the allocation amount calculation unit 24 calculates the additional allocation amount $G_{add}$ by Equation (4) (step S230). The allocation amount calculation unit 24 initializes the variable i by setting it to 0 (step S235). The allocation amount calculation unit 24 determines whether the variable i has reached the connected ONU number (step S240). When it is determined that the variable i has not reached the connected ONU number, the allocation amount calculation unit 24 determines whether at least one condition is satisfied between (condition 1) that a transmission-permitted period holding value $N_{cycle\_hold}[i]$ for ONU #i is greater than 0 and (condition 2) that the effective ONU number $N_{onu\_effective}$ is 0 (step S245). When it is determined that at least one of condition 1 and condition 2 is satisfied, the allocation amount calculation unit 24 adds the additional allocation amount $G_{add}$ to the current allocation amount Q[i] of ONU #i (step S250).

After it is determined that neither of condition 1 and condition 2 is satisfied in step S245, or after the processing of step S250, the allocation amount calculation unit 24 determines whether the transmission-permitted period holding value $N_{cycle\_hold}[i]$ for ONU #i is greater than 0 (step S255). When it is determined that the transmission-permitted period holding value $N_{cycle\_hold}[i]$ is greater than 0, the allocation amount calculation unit 24 subtracts 1 from a current value of the transmission-permitted period holding value $N_{cycle\_hold}[i]$ (step S260). Meanwhile, when it is determined that the transmission-permitted period holding value $N_{cycle\_hold}[i]$ for ONU #i is smaller than or equal to 0, the allocation amount calculation unit 24 sets the transmission-permitted period holding value $N_{cycle\_hold}[i]$ to 0 (step S265). After the processing of step S260 or step S265, the allocation amount calculation unit 24 adds 1 to the current value of the variable i (step S270) and repeats the processing from step S240. When it is determined that the variable i has reached the connected ONU number, the allocation amount calculation unit 24 finishes the processing of FIG. 5.

When the processing of FIG. 5 is finished, the allocation amount calculation unit 24 performs the processing of step S30 of FIG. 3, outputs an allocation amount Q[i] of each ONU #i determined in the fixed allocation processing and the additional allocation processing of FIG. 5 to the transceiver unit 25, and notifies each ONU 3 of the allocation amount Q[i].

The first embodiment of the present invention has been described above. In the additional allocation processing of the above description, when an effective ONU number is 0, a non-allocated bandwidth is equally divided by a connected ONU number, but the present invention is not limited to this case. For example, the allocation amount calculation unit 24 may treat a non-allocated bandwidth as a bandwidth for detecting a new ONU. Also, the allocation amount calculation unit 24 may equally distribute a non-allocated bandwidth to ONUs 3 whose mobile data amounts are 0.

Further, it has been described above that a transmission-permitted period start position and a transmission-permitted period length are determined at each allocation cycle, but a plurality of allocation cycles may be collectively processed. In this case, the allocation amount calculation unit 24 notifies the transmission-permitted period start position determining unit 22 of an end time of a period obtained by collecting the plurality of allocation cycles and acquires a transmission-permitted period start position and a transmission-permitted period length corresponding to the end time. The allocation amount calculation unit 24 temporarily holds the acquired values and compares a start time of an allocation cycle, which is an execution target of bandwidth allocation, and the held transmission-permitted period start position when performing bandwidth allocation of each allocation cycle in the collected period. When the transmission-permitted period start position is earlier than the start time of the allocation cycle which is the execution target of bandwidth allocation, the allocation amount calculation unit 24 adds the transmission-permitted period length held in the allocation cycle to a transmission-permitted period holding value.

Second Embodiment

Figure 6:
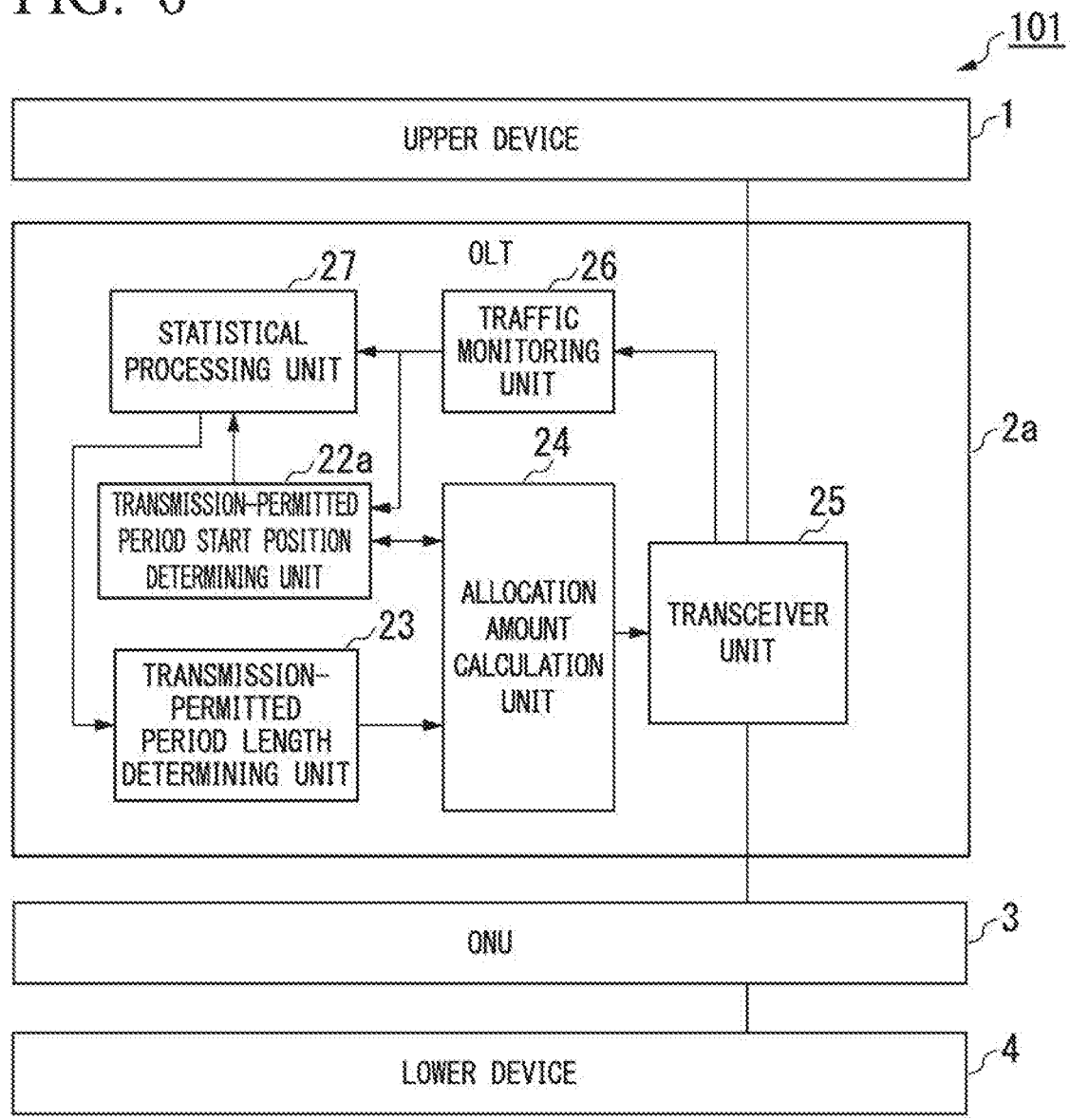
FIG. 6 is a functional block diagram of a communication system according to a second embodiment.

FIG. 6 is a functional block diagram of a communication system 101 according to a second embodiment. In FIG. 6, parts identical to those of the communication system 100 according to the first embodiment shown in FIG. 2 are given the same reference numerals, and descriptions thereof are omitted. The communication system 101 shown in FIG. 6 differs from the communication system 100 shown in FIG. 2 in that an OLT 2a is provided instead of the OLT 2. The OLT 2a differs from the OLT 2 shown in FIG. 2 in that a traffic monitoring unit 26 and a statistical processing unit 27 are provided instead of the cooperative processing unit 21, and a transmission-permitted period start position determining unit 22a is provided instead of the transmission-permitted period start position determining unit 22.

At each allocation cycle, the traffic monitoring unit 26 monitors the traffic amount of upstream data transmitted from each ONU 3 in an allocation cycle. The traffic monitoring unit 26 notifies the statistical processing unit 27 and the transmission-permitted period start position determining unit 22a of a monitored value. The statistical processing unit 27 estimates a mobile data amount of each ONU 3 in each TTI from an upstream data amount of each ONU 3 acquired from the traffic monitoring unit 26. For example, the method disclosed in Non-Patent Document 2 may be used as an estimation method. Specifically, an average μ and a variance σ of mobile data amounts of respective ONUs 3 in each TTI (per autonomous period which is described below) are separately calculated from traffic monitoring values, and μ[i]+M×σ[i] (M is an integer) is treated as a mobile data amount of ONU #i.

The transmission-permitted period start position determining unit 22a detects a time at which generation of mobile data begins in an autonomous period (whose period length is the same as a TTI length) from results acquired from the traffic monitoring unit 26. Specifically, the transmission-permitted period start position determining unit 22a acquires traffic monitoring results of each ONU 3 in each allocation cycle and observes, at each autonomous period, allocation cycles switching from an allocation cycle in which the amount of monitoring values of mobile data amounts indicated by the traffic monitoring results is less than a threshold value to an allocation cycle in which the amount is the threshold value or more. When these switching allocation cycles are detected, the transmission-permitted period start position determining unit 22a extracts a time difference between a start time of the detected allocation cycles and a start time of an autonomous cycle. In the second embodiment, the OLT 2a performs allocation processing by treating a start time of an autonomous period as a start time of a TTI. For this reason, the extracted time difference is considered to be a processing latency from the view of the OLT 2a. Therefore, the time difference is treated as a processing latency in the second embodiment and is held in the transmission-permitted period start position determining unit 22a. The threshold value is, for example, the amount of non-user data of a control signal and the like transmitted from a lower device 4 to an upper device 1. The autonomous period is a period controlled by the OLT 2a and may or may not be synchronized with a TTI of a mobile wireless communication system.

When the transmission-permitted period start position determining unit 22a is notified of a start time of an allocation cycle, which is treated as a bandwidth allocation target, by the allocation amount calculation unit 24, the transmission-permitted period start position determining unit 22a confirms whether the start time that is notified of is after a time obtained by adding the held value (the processing latency) to the start time of the autonomous period as an offset. When the start time of the allocation cycle is after the time calculated through the addition, an instruction is issued to read the mobile data amounts statistically obtained from the statistical processing unit 27. The transmission-permitted period length determining unit 23 is notified of the read mobile data amount of each ONU 3, and a transmission-permitted period length is determined by the same processing as in the first embodiment.

In FIG. 6, the traffic monitoring unit 26, the statistical processing unit 27, the transmission-permitted period start position determining unit 22a, the transmission-permitted period length determining unit 23, and the allocation amount calculation unit 24 are provided in the OLT 2a, but all or some of them can be provided in a bandwidth allocation device which is an external device of the OLT 2a.

Third Embodiment

Figures 7, 8:
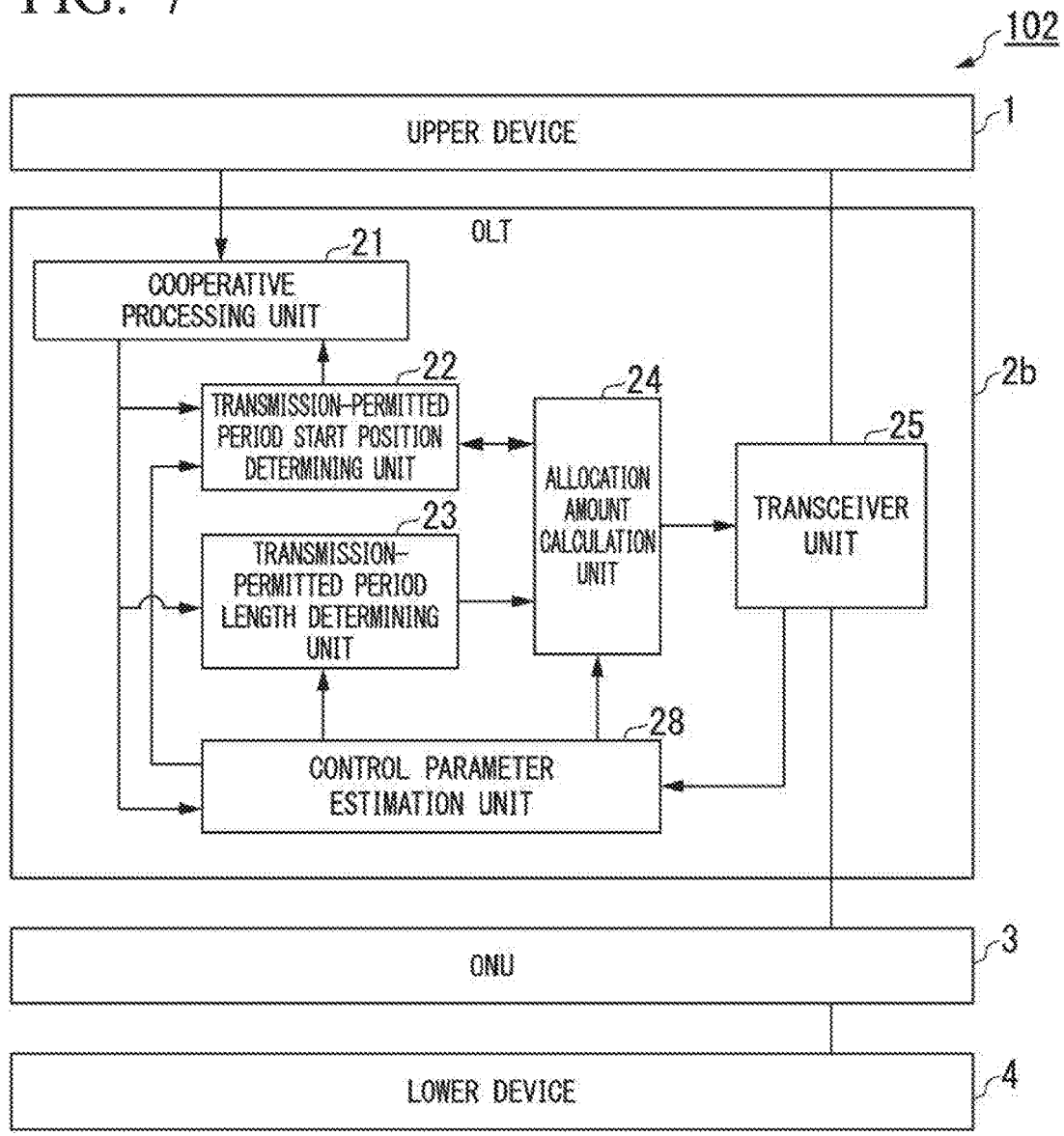
FIG. 7 is a functional block diagram of a communication system according to a third embodiment.
FIG. 8 is a diagram showing an example of results obtained by sweep processing according to the third embodiment.

FIG. 7 is a functional block diagram of a communication system 102 according to a third embodiment. In FIG. 7, parts identical to those of the communication system 100 according to the first embodiment shown in FIG. 2 are given the same reference numerals, and descriptions thereof are omitted. The communication system 102 shown in FIG. 7 differs from the communication system 100 shown in FIG. 2 in that an OLT 2b is provided instead of the OLT 2. The OLT 2b differs from the OLT 2 shown in FIG. 2 in that a control parameter estimation unit 28 is provided. The control parameter estimation unit 28 estimates a processing latency $T_{latency}$ in a lower device 4 and a minimum arrival amount $D_{min}$ which is a minimum amount of upstream data transmitted from a lower device 4 to an ONU 3.

The control parameter estimation unit 28 estimates the processing latency $T_{latency}$ and then estimates the minimum arrival amount $D_{min}$. In these estimations, an accumulated data amount included in a required transmission amount notification obtained from an ONU 3 is used. The accumulated data amount indicates the data amount of non-transmitted upstream data which should be transmitted to an upper device but is stored in the ONU 3 at a point in time at which the required transmission amount notification is transmitted. To acquire the accumulated data amount, the control parameter estimation unit 28 notifies a transmission instruction of the required transmission amount notification to the ONU 3 through the allocation amount calculation unit 24 and the transceiver unit 25.

When the transmission instruction is received from the control parameter estimation unit 28, the allocation amount calculation unit 24 additionally allocates a bandwidth in which the ONU 3 transmits the required transmission amount notification to the OLT regarding bandwidth allocation to an allocation cycle for a notification of the received transmission instruction. When additionally allocating a bandwidth, the allocation amount calculation unit 24 ensures the bandwidth by subtracting a bandwidth used to transmit the required transmission amount notification from a bandwidth $G_{effective}$ that can be used to transmit user data. The allocation amount calculation unit 24 provides the notification to the ONU 3 through the transceiver unit 25 so that the ONU 3 transmits the required transmission amount notification in the allocated bandwidth.

When the required transmission amount notification is received from the ONU 3 in response to the transmission instruction, the transceiver unit 25 notifies the control parameter estimation unit 28 of the accumulated data amount included in the required transmission amount notification and a signal representing completion of reception. Due to the above-described operation of the allocation amount calculation unit 24 and the transceiver unit 25, the control parameter estimation unit 28 can acquire the required transmission amount notification in response to the transmission instruction and control the timing of acquiring the required transmission amount notification. A process in which the control parameter estimation unit 28 estimates the processing latency $T_{latency}$ and the minimum arrival amount $D_{min}$ by using the accumulated data amount is sequentially described below.

[Processing Latency Estimation Process]

In an estimation process of the processing latency $T_{latency}$, the control parameter estimation unit 28 detects an allocation cycle number which is highly likely to include a time at which mobile data begins to arrive at the OLT 2 (hereinafter, referred to as a mobile data arrival time). Specifically, the control parameter estimation unit 28 provides a notification of a transmission instruction of a required transmission amount notification in a TTI in which a mobile data amount indicating the amount of upstream user data received from a communication terminal of each user by a lower device is not 0. The control parameter estimation unit 28 switches allocation cycles for providing a notification of a transmission instruction of a required transmission amount notification in numerical order. Hereinafter, the process of providing a notification of a transmission instruction while switching allocation cycles in numerical order is referred to as sweep processing.

The control parameter estimation unit 28 acquires the number of times that an accumulated data amount greater than the threshold value is acquired in each allocation cycle while repeating sweep processing the certain number of times. Hereinafter, the number of times that an accumulated data amount greater than the threshold value is acquired is referred to as a detection number. The control parameter estimation unit 28 specifies a period in which allocation cycles with a detection number of 0 continue and detects an allocation cycle with the highest detection number after the specified period. The control parameter estimation unit 28 estimates the detected allocation cycle as an allocation cycle including a mobile data arrival time. The control parameter estimation unit 28 calculates the processing latency $T_{latency}$ by multiplying an allocation cycle length and a difference between the estimated allocation cycle number and an allocation cycle number including a mobile data receiving time.

FIG. 8 is a diagram showing an example of results obtained by sweep processing according to the third embodiment. FIG. 8 shows detection numbers in respective allocation cycles with allocation cycle numbers of 0 to $N_{grant}-1$. In this example, a detection number of 0 continues in a period from an allocation cycle number of 0 to an allocation cycle number of 14 and a period from an allocation cycle number of 20 to an allocation cycle number of $N_{grant}-1$. Since a detection number of the $16^{th}$ allocation cycle behind $0^{th}$ to $14^{th}$ allocation cycles is the largest number, the control parameter estimation unit 28 estimates the $16^{th}$ allocation cycle as an allocation cycle including a mobile data arrival time.

The range of allocation cycle numbers which are targets of sweep processing is determined as follows. An allocation cycle number of an allocation cycle with a start time closest to a time $(Time[i]+T_{offset})$ obtained by adding a predetermined offset time $T_{offset}$ to a mobile data receiving time $(Time[i])$ in a lower device 4 connected to an $i^{th}$ ONU 3 is treated as $M_{receive}[i]$. When the allocation cycle number $M_{receive}[i]$ is used, the range of allocation cycle numbers which are targets of sweep processing is the range of $S[i]$ satisfying Equation (5).

[Math. 5]

$$\begin{cases} M_{receive}[i] - K \leq S[i] \leq M_{recieve}[i] + K & (5) \\ \quad (\text{if } K \leq M_{recieve}[i] \leq N_{grant} - K - 1) \\ M_{recieve}[i] - K \leq S[i] \leq N_{grant} - 1, \\ 0 \leq S[i] \leq (M_{recieve}[i] + K) \bmod N_{grant} \\ \quad (\text{if } M_{recieve}[i] \geq K \text{ and } M_{recieve}[i] > N_{grant} - K - 1) \\ 0 \leq S[i] \leq M_{recieve}[i] + K, \\ N_{grant} - 1 - K + M_{recieve}[i] \leq S[i] \leq N_{grant} - 1 \\ \quad (\text{if } M_{recieve}[i] < K \text{ and } M_{recieve}[i] \leq N_{grant} - K - 1) \end{cases}$$

In Equation (5), $S[i]$ indicates an allocation cycle number of an examination target on which sweep processing is performed with respect to the $i^{th}$ ONU 3. K is a value satisfying Equation (6). K is a value for determining how many allocation cycles are treated as examination targets centering on the allocation cycle number $M_{receive}[i]$.

[Math. 6]

$$0 < K \leq \left\lfloor \frac{N_{grant} - 1}{2} \right\rfloor \tag{6}$$

Figure 9:
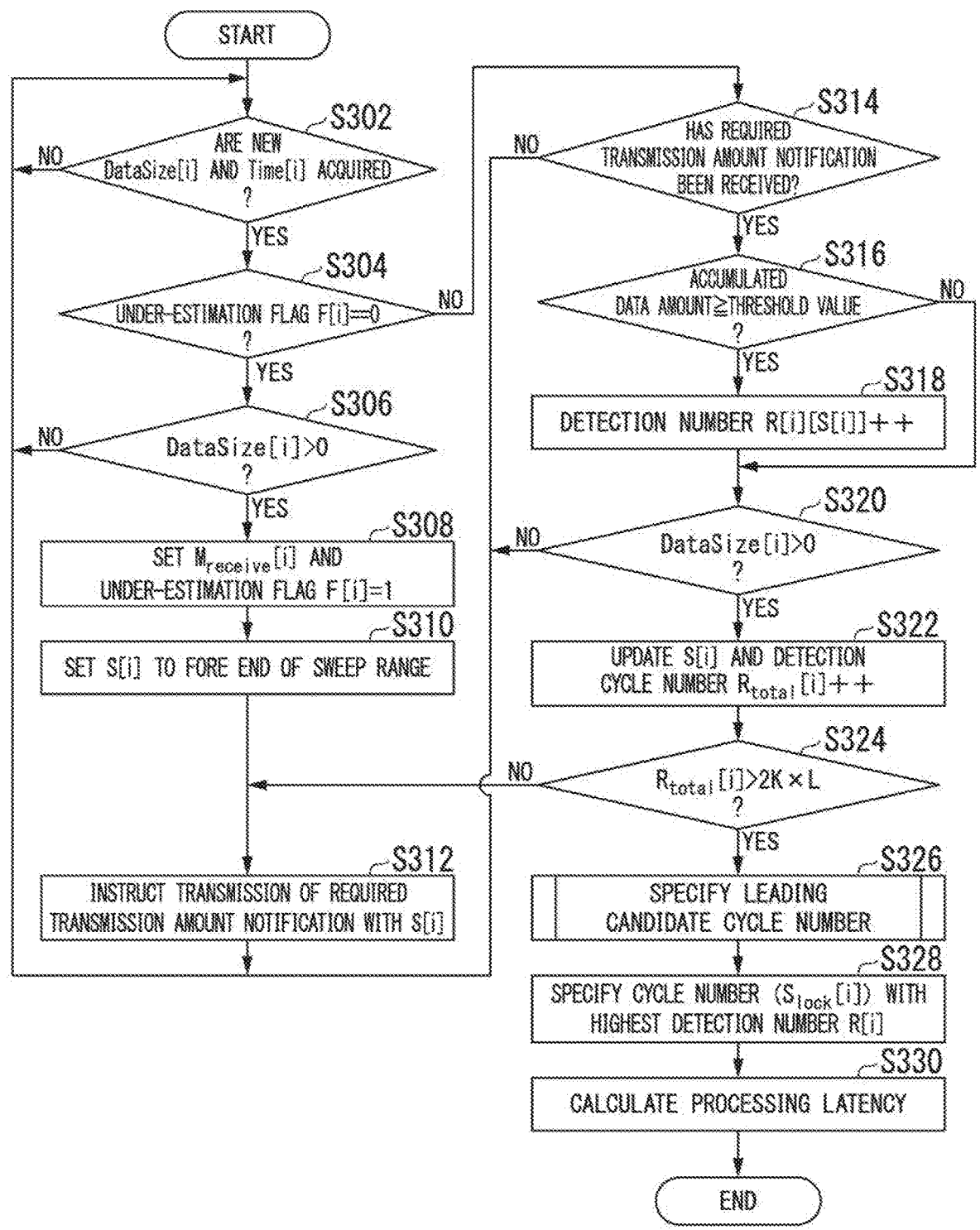
FIG. 9 is a flowchart showing a processing latency estimation process of a control parameter estimation unit according to the third embodiment.

FIG. 9 is a flowchart showing a processing latency estimation process of the control parameter estimation unit 28 according to the third embodiment. The control parameter estimation unit 28 executes the flow shown in FIG. 9 for each ONU 3 connected to the OLT 2b. FIG. 9 shows processing for an $i^{th}$ ONU 3 among connected ONUs 3. Hereinafter, the $i^{th}$ ONU 3 is referred to as ONU #i.

When a process of estimating a processing latency begins, the control parameter estimation unit 28 waits until a mobile data amount DataSize[i] and a mobile data receiving time Time[i] relating to ONU #i are newly acquired from the cooperative processing unit 21 (step S302). When a new mobile data amount and mobile data receiving time are acquired (step S302, YES), the control parameter estimation unit 28 determines whether an under-estimation flag F[i], which indicates that a processing latency for ONU #i is being estimated, is 0 (step S304). The mobile data amount and the mobile data receiving time acquired from the cooperative processing unit 21 by the control parameter estimation unit 28 are the same as those pieces of information acquired from the cooperative processing unit 21 by the transmission-permitted period start position determining unit 22. The control parameter estimation unit 28 may operate in synchronization with the transmission-permitted period start position determining unit 22.

When the under-estimation flag F[i] is 0 (step S304, YES), the control parameter estimation unit 28 determines whether the acquired mobile data amount DataSize[i] is greater than 0 (step S306). When the mobile data amount is 0 (step S306, NO), the control parameter estimation unit 28 returns the process to step S302. When the mobile data amount is greater than 0 (step S306, YES), the control parameter estimation unit 28 sets the under-estimation flag F[i] to 1 which represents that the estimation is underway. Further, the control parameter estimation unit 28 specifies the allocation cycle number $M_{receive}[i]$ on the basis of the acquired mobile data receiving time (step S308).

The control parameter estimation unit 28 specifies the range of allocation cycle numbers which are targets of sweep processing and sets S[i] to an allocation cycle number positioned at the front end of the specified range (step S310). The allocation cycle indicated by S[i] initially becomes a target of examination. The control parameter estimation unit 28 outputs the allocation cycle number indicated by S[i] and a transmission instruction of a required transmission amount notification to the allocation amount calculation unit 24 in order to acquire a required transmission amount notification in the allocation cycle indicated by S[i] (step S312) and returns the process to step S302.

When the under-estimation flag F[i] is not 0 (step S304, NO), the control parameter estimation unit 28 determines whether the transceiver unit 25 has received a required transmission amount notification in response to the transmission instruction of step S312 (step S314). When the transceiver unit 25 has not received a required transmission amount notification (step S314, NO), the control parameter estimation unit 28 returns the process to step S302 and waits until the transceiver unit 25 receives a required transmission amount notification. The transceiver unit 25 notifies completion of reception of a required transmission amount notification to the control parameter estimation unit 28. Further, the control parameter estimation unit 28 is also notified of an accumulated data amount included in the required transmission amount notification.

When the transceiver unit 25 receives a required transmission amount notification (step S314, YES), the control parameter estimation unit 28 determines whether the accumulated data amount in ONU #i is greater than or equal to the threshold value (step S316). When the accumulated data amount is greater than or equal to the threshold value (step S316, YES), the control parameter estimation unit 28 determines that mobile data to be transmitted in the allocation cycle which is an examination target indicated by S[i] has been detected and increases a detection number R[i][S[i]] by 1 (step S318). An initial value of each detection number R[i][S[i]] is 0. When the accumulated data amount is less than the threshold value (step S316, NO), the control parameter estimation unit 28 advances the process to step S320. The threshold value is determined in advance on the basis of, for example, the data amount of non-user data of a control signal and the like transmitted from a lower device to an upper device. In step S316, it is determined whether upstream user data (mobile data) is in data buffered in ONU #i.

The control parameter estimation unit 28 determines whether the acquired mobile data amount is greater than 0 (step S320). When the mobile data amount is smaller than or equal to 0 (step S320, NO), the control parameter estimation unit 28 returns the process to step S302.

When the mobile data amount is greater 0 (step S320, YES), the control parameter estimation unit 28 changes S[i] indicating the allocation cycle which is the current examination target with an allocation cycle number of an allocation cycle of the next examination target and increases an examination cycle number $R_{total}[i]$ by 1 (step S322). The control parameter estimation unit 28 determines whether the examination cycle number $R_{total}[i]$ is greater than a specified value (2K×L) (step S324). When the examination cycle number $R_{total}[i]$ is small than or equal to (2K×L) (step S324, NO), the control parameter estimation unit 28 returns the process to step S312 in order to acquire a required transmission amount notification of an allocation cycle which is the next examination target indicated by S[i] changed in step S322.

The specified value (2K×L) in step S324 is the number of repetitions of the processing from step S302 to step S322. In other words, the control parameter estimation unit 28 determines L times whether upstream user data (mobile data) is in each of 2K allocation cycles which are targets of sweep processing. The repetition number L is determined in advance according to accuracy required for the processing latency.

When the examination cycle number $R_{total}[i]$ is greater than (2K×L) (step S324, YES), the control parameter estimation unit 28 finishes the sweep processing and specifies, as a leading candidate cycle number, an allocation cycle number of an allocation cycle immediately after a period in which allocation cycles with a detection number of 0 continue on the basis of detection numbers R[i][S[i]] of respective allocation cycles (step S326). The leading candidate cycle, number indicates a candidate for an allocation cycle including a mobile data arrival time.

The control parameter estimation unit 28 specifies an allocation cycle with the highest detection number R[i] among allocation cycles close to Y from the allocation cycle indicated by the leading candidate cycle number as an allocation cycle number $S_{lock}[i]$ of an allocation cycle including a mobile data arrival time (step S328). The value Y determining allocation cycles close to Y may be, for example, a value obtained by multiplying a division number $N_{grant}$ and ¼ or ⅛.

The control parameter estimation unit 28 calculates a processing latency $T_{latency}$ in a lower device 4 connected to ONU #i on the basis of the allocation cycle number $S_{lock}[i]$ specified in step S328 and the allocation cycle number $M_{receive}[i]$ (step S330) and finishes the estimation processing. The control parameter estimation unit 28 calculates the processing latency $T_{latency}$ by using Equation (7). In Equation (7), $T_{period}$ is an allocation cycle length.

[Math. 7]

$$T_{latency} = \begin{cases} (N_{grant} - M_{recieve}[i] + S_{lock}[i]) \times T_{period}, & \text{if } M_{recieve}[i] - S_{lock}[i] > K \\ (S_{lock}[i] - M_{recieve}[i]) \times T_{period}, & \text{if } 0 < M_{recieve}[i] - S_{lock}[i] \leq K \\ (S_{lock}[i] - M_{recieve}[i]) \times T_{period}, & \text{if } 0 < S_{lock}[i] - M_{recieve}[i] \leq K \\ (S_{lock}[i] - N_{grant} - M_{recieve}[i]) \times T_{period}, & \text{if } S_{lock}[i] - M_{recieve}[i] > K \end{cases} \quad (7)$$

Figure 10:
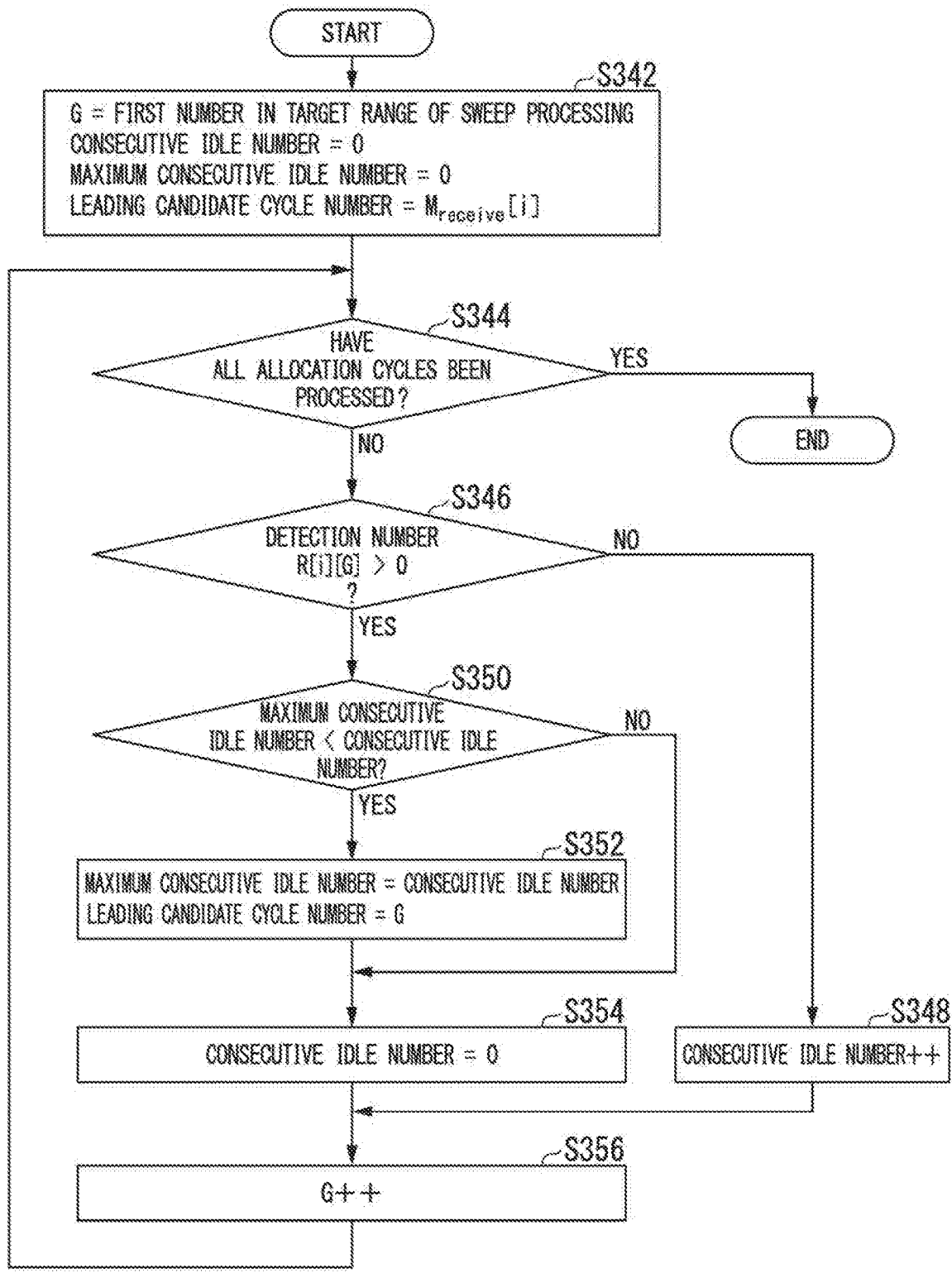
FIG. 10 is a flowchart showing a process in which the control parameter estimation unit specifies a leading candidate cycle number according to the third embodiment.

FIG. 10 is a flowchart showing a process in which the control parameter estimation unit 28 specifies a leading candidate cycle number according to the third embodiment. The process shown in FIG. 10 shows an example of the processing of step S326 in the processing latency estimation process shown in FIG. 9. When the specification of a leading candidate cycle number begins, the control parameter estimation unit. 28 initializes each variable used in the process (step S342).

In the initialization of variables, the control parameter estimation unit 28 sets a variable G to a first allocation cycle number in the range of allocation cycle numbers which are targets of sweeping, sets a consecutive idle number and a maximum consecutive idle number to 0, and sets a leading candidate cycle number to the allocation cycle number $M_{receive}[i]$.

The control parameter estimation unit 28 determines whether the processing from step S346 to step S354 has been performed on all the allocation cycles which are targets of sweeping (step S344). When there is an allocation cycle on which the processing has not been performed (step S344, NO), the control parameter estimation unit 28 determines whether a detection number R[i][G] is greater than 0 (step S346).

When the detection number R[i][G] is smaller than or equal to 0 (step S346, NO), the control parameter estimation unit 28 increases the consecutive idle number by 1 (step S348) and advances the process to step S356. When the detection number R[i][G] is greater than 0 (step S346, YES), the control parameter estimation unit 28 determines whether the consecutive idle number is greater than the maximum consecutive idle number (step S350).

When the consecutive idle number is greater than the maximum consecutive idle number (step S350, YES), the control parameter estimation unit 28 treats the consecutive idle number as a new maximum consecutive idle number and updates the leading candidate cycle number with a current value of G (step S352). When the consecutive idle number is smaller than or equal to the maximum consecutive idle number (step S350, NO), the control parameter estimation unit 28 advances the process to step S354.

The control parameter estimation unit 28 sets the consecutive idle number to 0 (step S354), increases the variable G indicating an allocation cycle number of a processing target by 1 (step S356), and returns the process to step S344. When the above-described processing from step S344 to step S356 is performed on all the allocation cycles which are targets of sweeping (step S344, YES), the control parameter estimation unit 28 finishes the process of specifying a leading candidate cycle number.

The control parameter estimation unit 28 estimates the processing latency $T_{latency}$ according to the above flows shown in FIG. 9 and FIG. 10.

[Minimum Arrival Amount Estimation Process]

When the processing latency estimation process is complete, the control parameter estimation unit 28 executes an estimation process of the minimum arrival amount $D_{min}$ and successively updates an estimated value of the minimum arrival amount $D_{min}$. An initial value ($D_{min,init}$) of the minimum arrival amount $D_{min}$ is given by, for example, Equation (8). $DataSize_{min}$ in Equation (8) is a minimum value that the mobile data amount DataSize[i] can have.

[Math. 8]
$$D_{min,init} = \left\lfloor \frac{DataSize_{min}}{N_{grant}} \right\rfloor \quad (8)$$

In a certain number of allocation cycles after the allocation cycle indicated by $S_{lock}[i]$, the control parameter estimation unit 28 acquires a change in the accumulated data amount of ONU #i and estimates a minimum arrival amount on the basis of the acquired change amount. When P indicates an allocation cycle number used to estimate a minimum arrival amount, the range of allocation cycles used for the estimation is from $S_{lock}[i]$ to $((S_{lock}[i]+P) \mod N_{grant})$. The allocation cycle number P is greater than or equal to 1 and smaller than or equal to $N_{grant}$.

Figure 11:
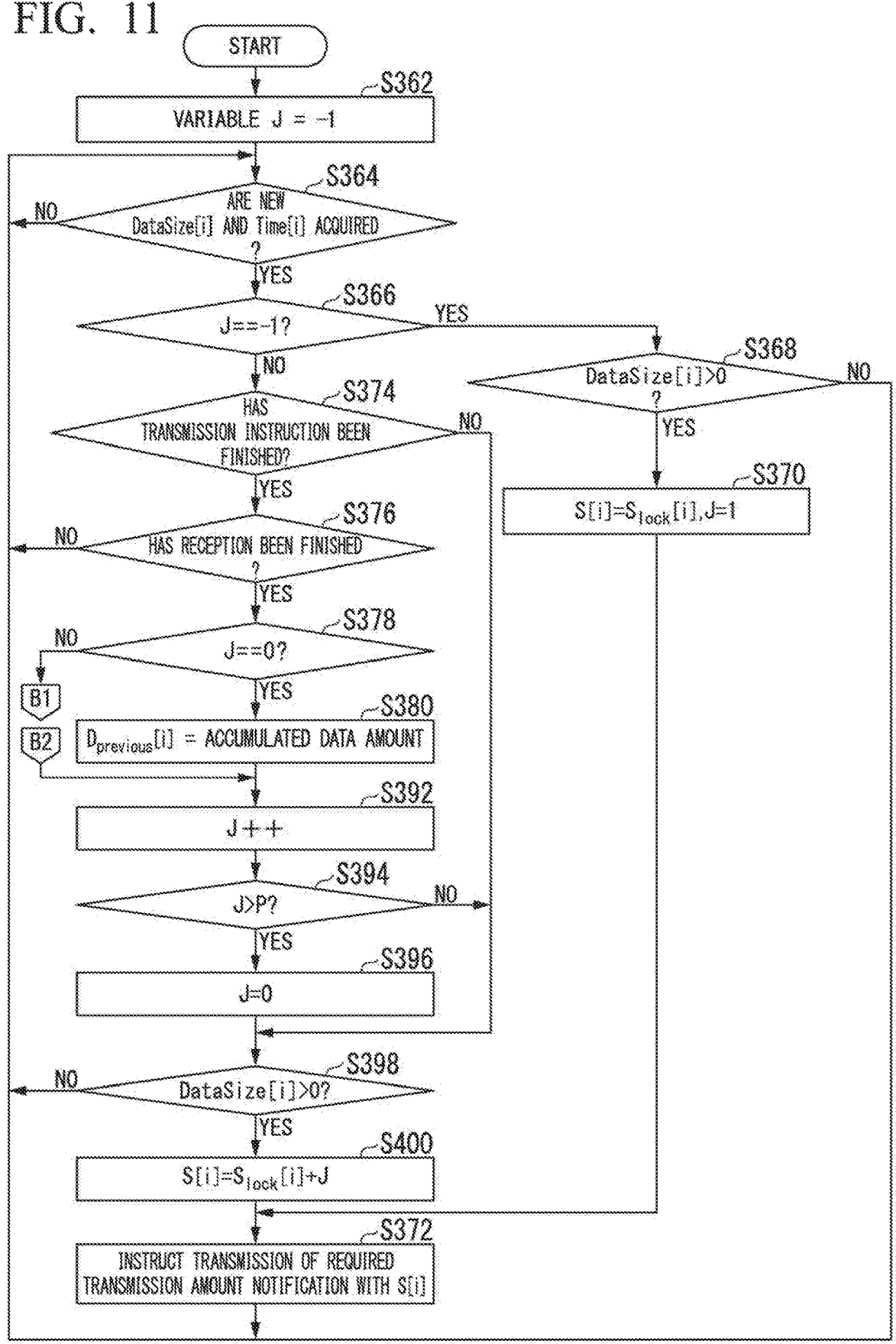
FIG. 11 is a first flowchart showing a minimum arrival amount estimation process of the control parameter estimation unit according to the third embodiment.
Figure 12:
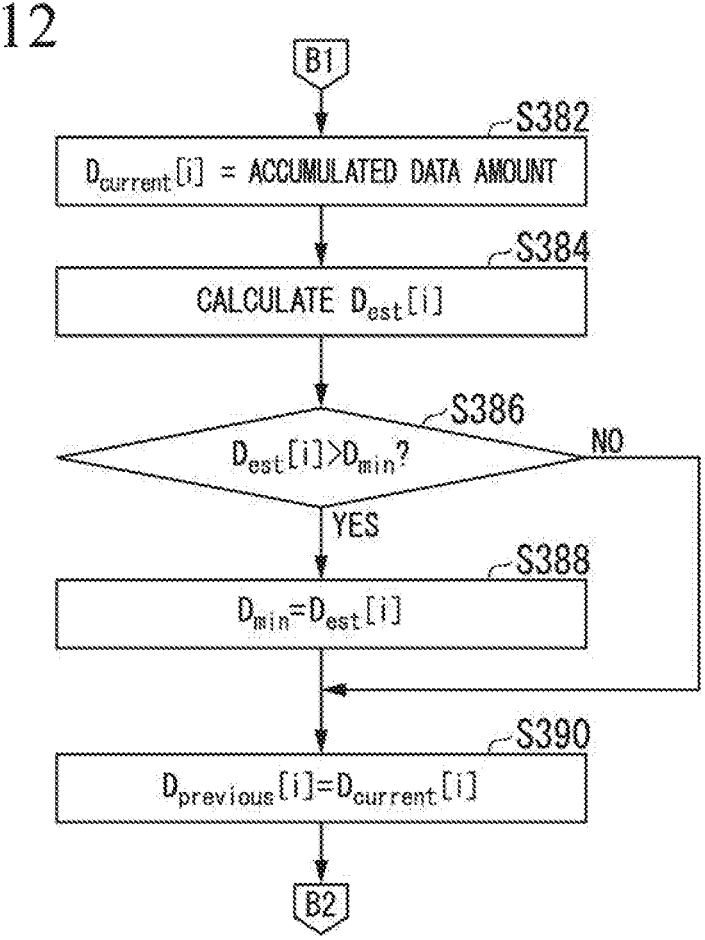
FIG. 12 is a second flowchart showing a minimum arrival amount estimation process of the control parameter estimation unit according to the third embodiment.

FIG. 11 and FIG. 12 are flowcharts showing a minimum arrival amount estimation process of the control parameter estimation unit 28 according to the third embodiment. When a minimum arrival amount estimation process begins, the control parameter estimation unit 28 sets a variable J to −1 (step S362) and waits until a mobile data amount DataSize[i] and a mobile data receiving time Time[i] relating to ONU #i are newly acquired from the cooperative processing unit 21 (step S364). When new mobile data amount and mobile data receiving time are acquired (step S364, YES), the control parameter estimation unit 28 determines whether the variable J is −1 (step S366).

When the variable J is −1 (step S366, YES), the control parameter estimation unit 28 determines whether a mobile data amount is greater than 0 (step S368). When the mobile data amount is smaller than or equal to 0 (step S368, NO), the control parameter estimation unit 28 returns to process to step S364 and waits until a mobile data amount greater than 0 is acquired. When the mobile data amount is greater than 0 (step S368, YES), the control parameter estimation unit 28 sets S[i] to $S_{lock}[i]$ indicating an allocation cycle number of an allocation cycle including a mobile data arrival time and sets the variable J to 1 (step S370).

In order to acquire a required transmission amount notification in an allocation cycle indicated by S[i], the control parameter estimation unit 28 outputs the allocation cycle number indicated by S[i] and a transmission instruction of a required transmission amount notification to the allocation amount calculation unit 24 (step S372). After outputting S[i] and the transmission instruction, the control parameter estimation unit 28 returns the process to step S364.

When the variable J is not −1 in step S366 (step S366, NO), the control parameter estimation unit 28 determines whether output of the transmission instruction of a required transmission amount notification has been finished (step S374). When the transmission of the transmission instruction has not been finished (step S374, NO), the control parameter estimation unit 28 advances the process to step S398. When the transmission of the transmission instruction has been finished (step S374, YES), the control parameter estimation unit 28 determines whether the transceiver unit 25 has received a required transmission amount notification (step S376). When the transceiver unit 25 has not received a required transmission amount notification (step S376, NO), the control parameter estimation unit 28 returns the process to step S364 and waits until a mobile data amount and a mobile data receiving time relating to ONU #i are newly acquired from the cooperative processing unit 21.

When the transceiver unit 25 has received a required transmission amount notification (step S376, YES), the control parameter estimation unit 28 determines whether the variable J is 0 (step S378). When the variable J is 0 (step S378, YES), the control parameter estimation unit 28 sets a data amount $D_{previous}[i]$ to an accumulated data amount included in the required transmission amount notification (step S380) and advances the process to step S392.

When the variable J is not 0 (step S378, NO), the control parameter estimation unit 28 sets the data amount $D_{previous}[i]$ to an accumulated data amount (step S382) and calculates a data amount $D_{est}[i]$ which has arrived at the OLT 2b in the allocation cycle indicated by S[i] with Equation (9) (step S384).

[Math. 9]
$$D_{est}[i] = \begin{cases} D_{current}[i] - D_{previous}[i], & \text{if } D_{current}[i] \geq D_{previous}[i] \\ D_{current}[i] - D_{previous}[i] + \left\lfloor \frac{G_{effective}}{N_{grant}} \right\rfloor, & \text{otherwise} \end{cases} \quad (9)$$

$D_{current}[i]$ is an accumulated data amount of the allocation cycle indicated by the allocation cycle number S[i], and $D_{previous}[i]$ is an accumulated data amount of an allocation cycle indicated by an allocation cycle number (S[i]−1). When the accumulated data amount is reduced, the control parameter estimation unit 28 calculates the difference as an arrived data amount. When the accumulated data amount is increased, the control parameter estimation unit 28 calculates an arrived data amount value by adding the difference to a value obtained by dividing a bandwidth $G_{effective}$ that can be used to transmit user data by the division number $N_{grant}$.

The control parameter estimation unit 28 determines whether the calculated data amount $D_{est}[i]$ is greater than the minimum arrival amount $D_{min}$ (step S386). When $D_{est}[i]$ is greater than $D_{min}$ (step S386, YES), the control parameter estimation unit 28 updates $D_{min}$ with a value of $D_{est}[i]$ (step S388). When $D_{est}[i]$ is smaller than or equal to $D_{min}$ (step S386, NO), the control parameter estimation unit 28 advances the process to step S390. The control parameter estimation unit 28 updates $D_{previous}[i]$ with a value of $D_{current}[i]$ (step S390) and advances the process to step S392.

An upper limit of the minimum arrival amount $D_{min}$ may be determined. An upper limit value $D_{min\_limit}$ of the minimum arrival amount $D_{min}$ is determined in advance. When the upper limit of the minimum arrival amount $D_{min}$ is determined, $D_{min}$ is updated by Equation (10) in step S388.

[Math. 10]

$$D_{min} = \min(D_{min\_limit}, D_{est}) \quad (10)$$

The control parameter estimation unit 28 increases the variable J by 1 (step S392) and determines whether the variable J is greater than the allocation cycle number P (step S394). When the variable J is greater than P (step S394, YES), the control parameter estimation unit 28 sets the variable J to 0 (step S396). When the variable J is smaller than or equal to P (step S394, NO), the control parameter estimation unit 28 advances the process to step S398.

The control parameter estimation unit 28 determines whether the mobile data amount DataSize[i] is greater than 0 (step S398) and returns the process to step S364 when DataSize[i] is smaller than or equal to 0 (step S398, NO). When DataSize[i] is greater than 0 (step S398, YES), the control parameter estimation unit 28 updates S[i] by setting S[i] to a value indicated by ($S_{lock}[i]+J$) (step S400) and changes the allocation cycle which is the processing target with the next allocation cycle. The control parameter estimation unit 28 advances the process to step S372 in order to acquire a required transmission amount notification in an allocation cycle indicated by the updated S[i].

The control parameter estimation unit 28 performs each part of processing from step S364 to step S400 on each allocation cycle from $S_{lock}[i]$ to (($S_{lock}[i]+P$) mod $N_{grant}$) to estimate the minimum arrival amount $D_{min}$. The control parameter estimation unit 28 continuously performs the minimum arrival amount estimation process shown in FIG. 11 and FIG. 12.

In the OLT 2b according to the third embodiment, the control parameter estimation unit 28 estimates a processing latency of a lower device 4 on the basis of an accumulated data amount in an ONU 3. Further, the transmission-permitted period start position determining unit 22 determines a transmission-permitted period start position for the ONU 3 on the basis of the estimated processing latency and a mobile data receiving time. The OLT 2b can accurately determine a transmission-permitted period including the entire arrival period of mobile data by using the processing latency based on operation of the ONU 3.

In the above description, the examination cycle number $R_{total}[i]$ is used as a counter whose value is increased every time the value of S[i] is changed, but the timing of change is not limited thereto. For example, the control parameter estimation unit 28 may increase the examination cycle number $R_{total}[i]$ when an accumulated data amount included in a required transmission amount notification is greater than or equal to the threshold value and the value of S[i] is updated. In this case, the total sum of detection numbers R[i] in respective allocation cycles which are targets of sweep processing is the same value as the examination cycle number $R_{total}[i]$.

Fourth Embodiment

An OLT in a fourth embodiment performs traffic pattern estimation in addition to the operation of the OLT 2b in the third embodiment. A traffic pattern is determined with the number of mobile data groups (burst data) which arrive at the OLT in one TTI. In the first to third embodiments, a case in which mobile data arrives at an OLT as one group of consecutive data has been described. In the fourth embodiment, a case in which mobile data in one TTI is divided into one or more pieces of burst data and arrives at an OLT is described.

In the fourth embodiment, an OLT has the same configuration as the OLT 2b of the third embodiment. In the fourth embodiment, the control parameter estimation unit 28 estimates the number of mobile data groups transmitted in one TTI (hereinafter, referred to as the number of burst frames) from a traffic pattern and determines K corresponding to the number of burst frames. The transmission-permitted period start position determining unit 22 and the transmission-permitted period length determining unit 23 respectively determine a transmission-permitted period start position and a transmission-permitted period length according to the number of burst frames. K is a value for determining how many allocation cycles are treated as examination targets centering on an allocation cycle number $M_{receive}[i]$. In the fourth embodiment, K depends on the number of burst frames B, which is the number of mobile data groups arriving in each TTI in a burst manner, and is determined by Equation (11).

[Math. 11]

$$K = \left\lceil \left\lfloor \frac{N_{grant}-1}{2} \right\rfloor \middle/ B \right\rceil \quad (11)$$

Figure 13:
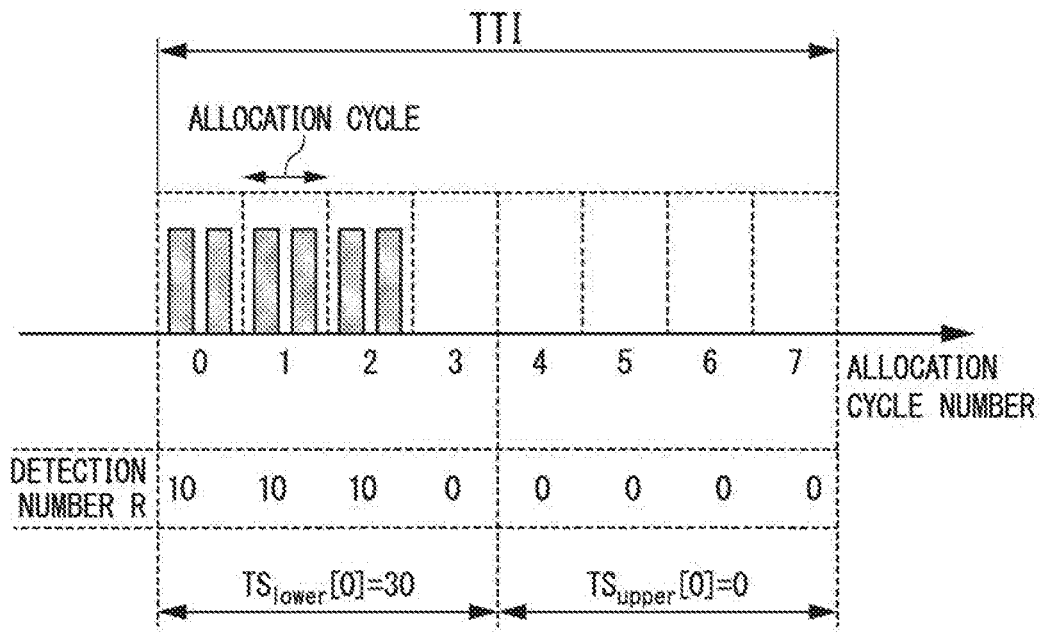
FIG. 13 is a diagram showing an example of a traffic pattern and an overview of a process of estimating the number of burst frames.
Figure 14:
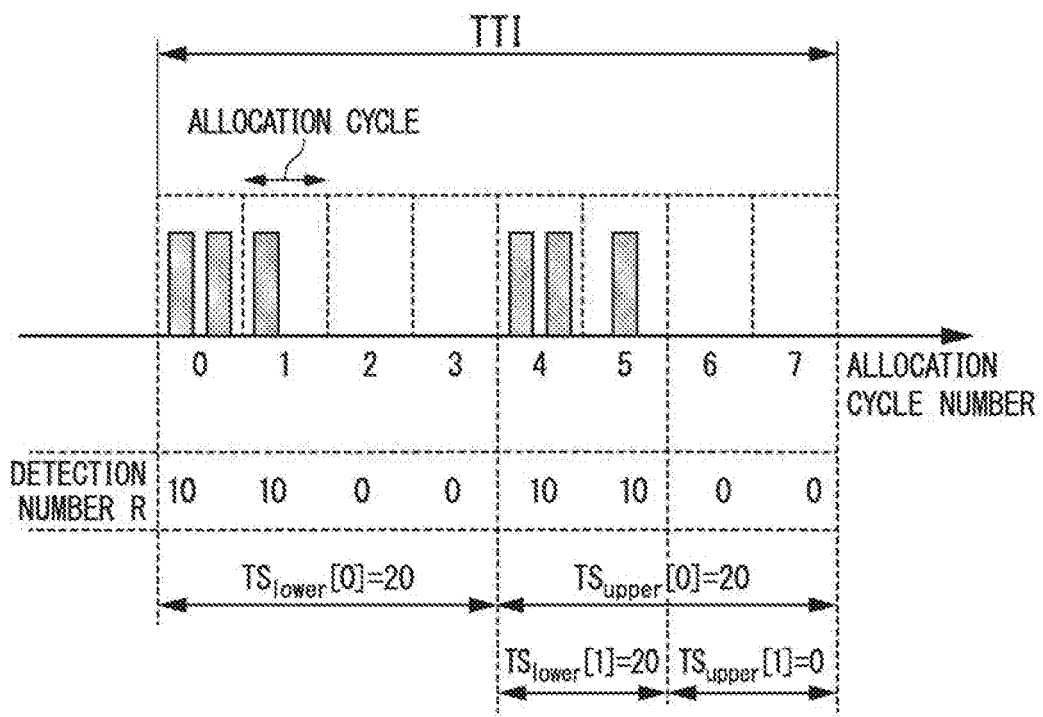
FIG. 14 is a diagram showing an example of a traffic pattern and an overview of a process of estimating the number of burst frames.

FIG. 13 and FIG. 14 are diagrams showing examples of traffic patterns and overviews of processes of estimating the number of burst frames. FIG. 13 shows a traffic pattern in which mobile data intensively arrives as one piece of burst data in each TI. In the traffic pattern shown in FIG. 13, the number of burst frames B is 1. FIG. 14 shows a traffic pattern in which mobile data is divided into two pieces of burst data and arrives in each TTI. In the traffic pattern shown in FIG. 14, the number of burst frames B is 2. The number of burst frames B estimated in the fourth embodiment is not a parameter changed depending on a mobile data amount but is a static parameter determined depending on installation and the like of a lower device. Operation of the control parameter estimation unit 28, the transmission-permitted period start position determining unit 22, and the transmission-permitted period length determining unit 23 in the fourth embodiment is described below.

[Operation of Control Parameter Estimation Unit 28]

After estimating the number of burst frames, the control parameter estimation unit 28 estimates a processing latency $T_{latency}$ and a minimum arrival amount $D_{min}$ on the basis of K corresponding to the estimated number of burst frames. The process of estimating a processing latency and a minimum arrival amount is the same as the process described in the third embodiment. The control parameter estimation unit 28 notifies the estimated number of burst frames, processing latency, and minimum arrival amount to the transmission-permitted period start position determining unit 22 and the transmission-permitted period length determining unit 23.

The overview of a process in which the control parameter estimation unit 28 estimates the number of burst frames is described with reference to FIG. 13 and FIG. 14. The control parameter estimation unit 28 divides allocation cycles in one TTI into a first half allocation cycle and a second half allocation cycle. In the example shown in FIG. 13, due to the first division, the first half allocation cycle includes allocation cycles of allocation cycle numbers 0, 1, 2, and 3, and the second half allocation cycle includes allocation cycles of allocation cycle numbers 4, 5, 6, and 7. The control parameter estimation unit 28 compares the sum of detection numbers R in the first half allocation cycle and the sum of detection numbers in the second half allocation cycle.

In the example shown in FIG. 13, detection numbers R of the allocation cycles of allocation cycle numbers 0, 1, and 2 are 10 each, and detection numbers R of the other allocation cycles are 0. Therefore, it is possible to obtain the sum of detection numbers in the first half cycles ($TS_{lower}[0]=30$) and the sum of detection numbers in the second half cycles ($TS_{upper}[0]=0$). When a difference between $TS_{lower}[0]$ and $TS_{upper}[0]$ is a certain value or more, the control parameter estimation unit 28 determines that the allocation of mobile data in the respective allocation cycles is biased. When a bias of allocation is detected due to the first division, the control parameter estimation unit 28 determines that the number of burst frames is 1 ($=2^{(a-1)}$, a=1).

In the example shown in FIG. 14, detection numbers R of the allocation cycles of allocation cycle numbers 0, 1, 4, and 5 are 10 each, and detection numbers R of the other allocation cycles are 0. Therefore, it is possible to obtain the sum of detection numbers in the first half cycle ($TS_{lower}[0]=20$) and the sum of detection numbers in the second half cycle ($TS_{upper}[0]=20$). When $TS_{lower}[0]$ coincides with $TS_{upper}[0]$ or a difference therebetween is not the certain value or more, the control parameter estimation unit 28 further halves the first half or second half cycle obtained by the first division. When the second half cycle obtained by the first division is halved, the allocation cycles of the allocation cycle numbers 4 and 5 are included in a first half cycle, and the allocation cycles of the allocation cycle numbers 6 and 7 are included in a second half cycle.

Due to the second division, it is possible to obtain the sum of detection numbers in the first half cycle ($TS_{lower}[1]=20$) and the sum of detection numbers in the second half cycle ($TS_{upper}[1]=0$). When a difference between $TS_{lower}[1]$ and $TS_{upper}[1]$ is the certain value or more, the control parameter estimation unit 28 determines that the allocation of mobile data in the respective allocation cycles is biased. When a bias of allocation is detected due to the second division, the control parameter estimation unit 28 determines that the number of burst frames is 2 ($=2^{(a-1)}$, a=2).

The control parameter estimation unit 28 recursively divides a TTI length into a first half allocation cycle and a second half allocation cycle and detects a bias of mobile data amount allocated to the first half allocation cycle and the second half allocation cycle. The control parameter estimation unit 28 calculates an estimation value of the number of burst frames from the number of times of division performed until a bias of mobile data amount is detected.

The control parameter estimation unit 28 sweeps allocation cycle numbers 0 to ($N_{grant}-1$), which indicate examination target allocation cycles in order to sequentially switch allocation cycles, in order to detect an allocation cycle in which an accumulated data amount greater than a predetermined threshold value is received by treating all allocation cycles as examination targets. In this detection, K is given by Equation (12). The control parameter estimation unit 28 acquires a detection number in each allocation cycle by repeating sweeping of allocation cycle numbers a certain number of times. A process of acquiring a detection number in each allocation cycle is the same as the process from step S302 to step S324 shown in FIG. 9 according to the third embodiment.

[Math. 12]

$$K = \left\lfloor \frac{N_{grant} - 1}{2} \right\rfloor \tag{12}$$

Figure 15:
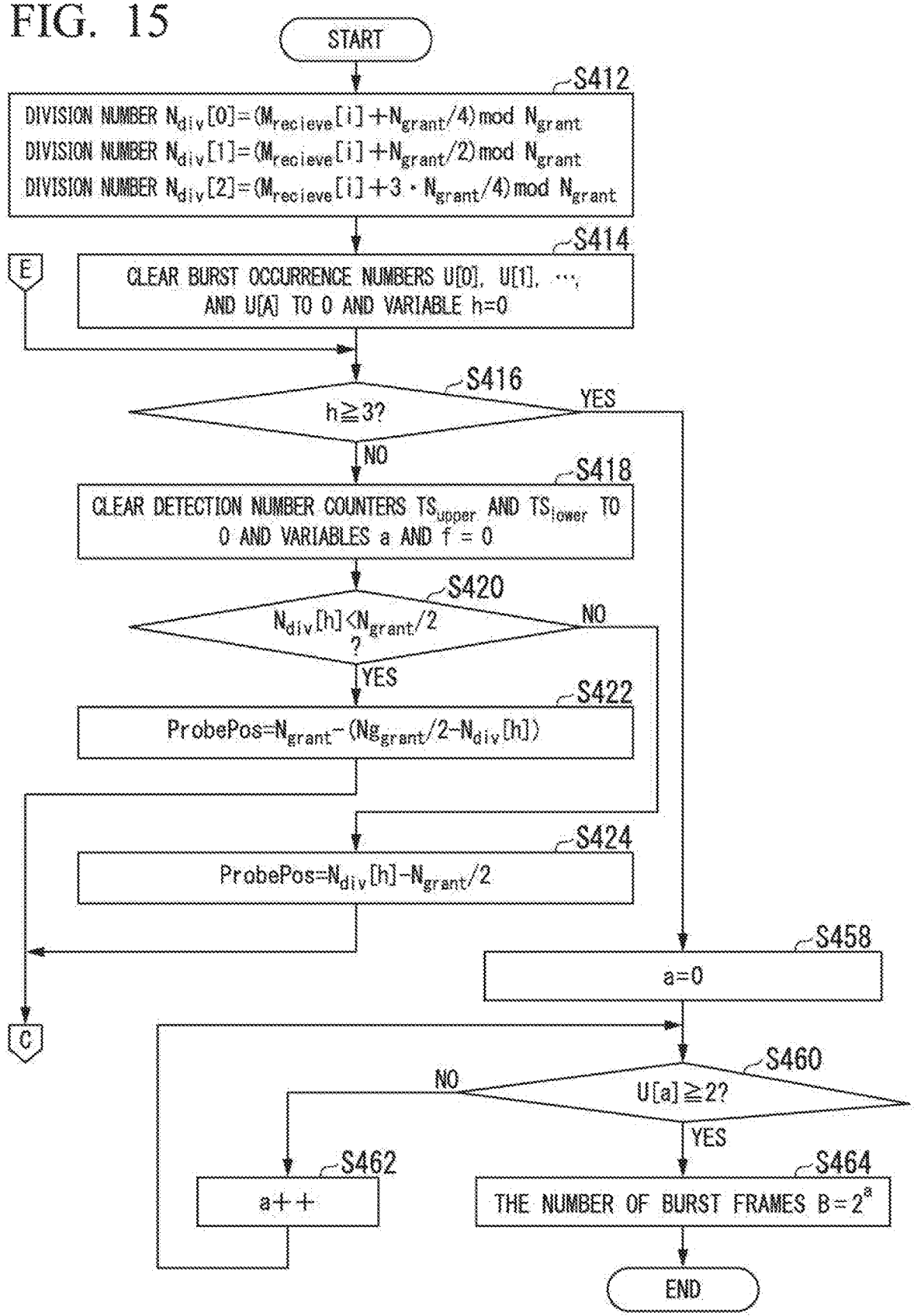
FIG. 15 is a first flowchart showing a process in which a control parameter estimation unit estimates the number of burst frames according to a fourth embodiment.
Figure 16:
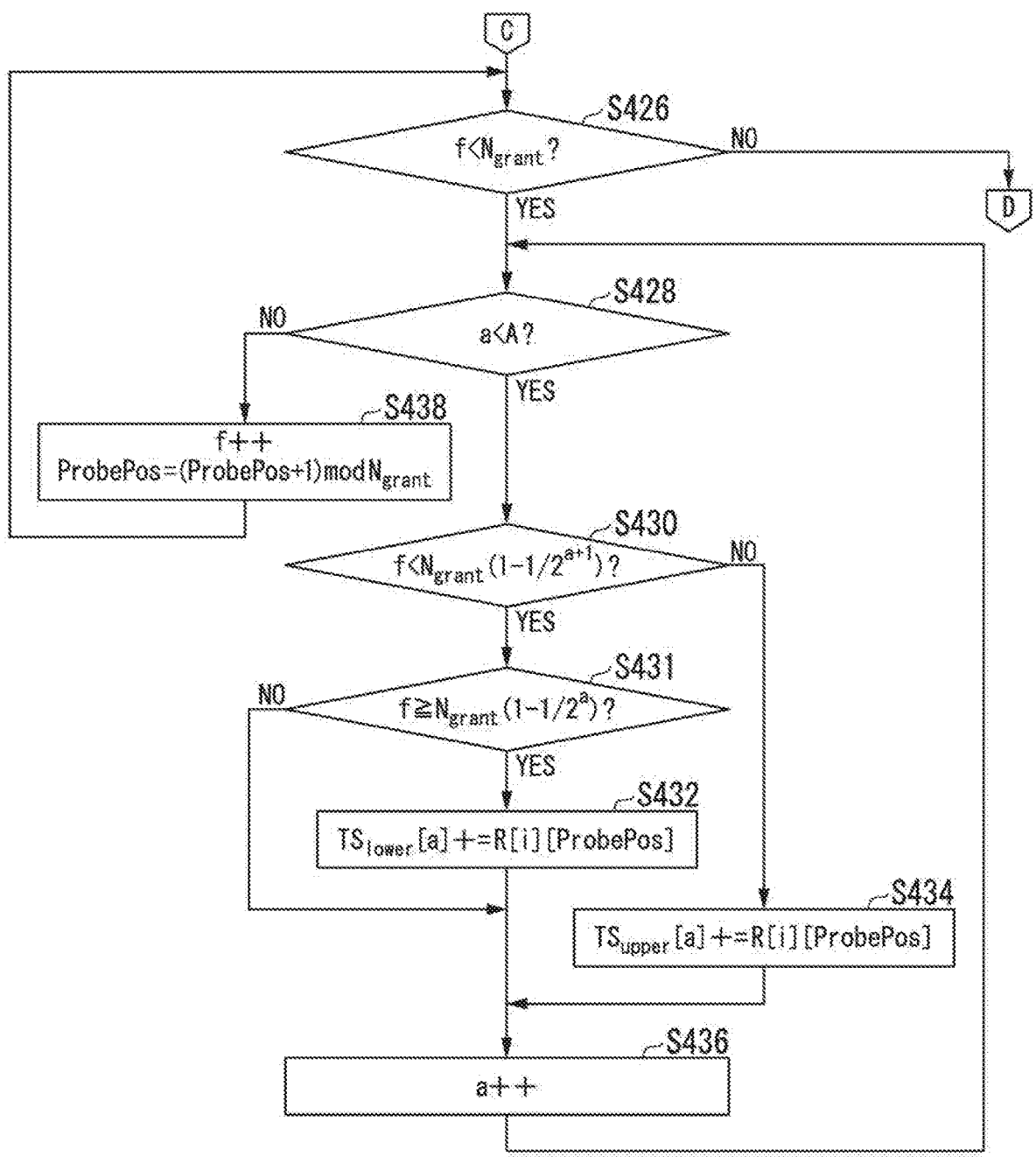
FIG. 16 is a second flowchart showing a process in which the control parameter estimation unit estimates the number of burst frames according to the fourth embodiment.
Figure 17:
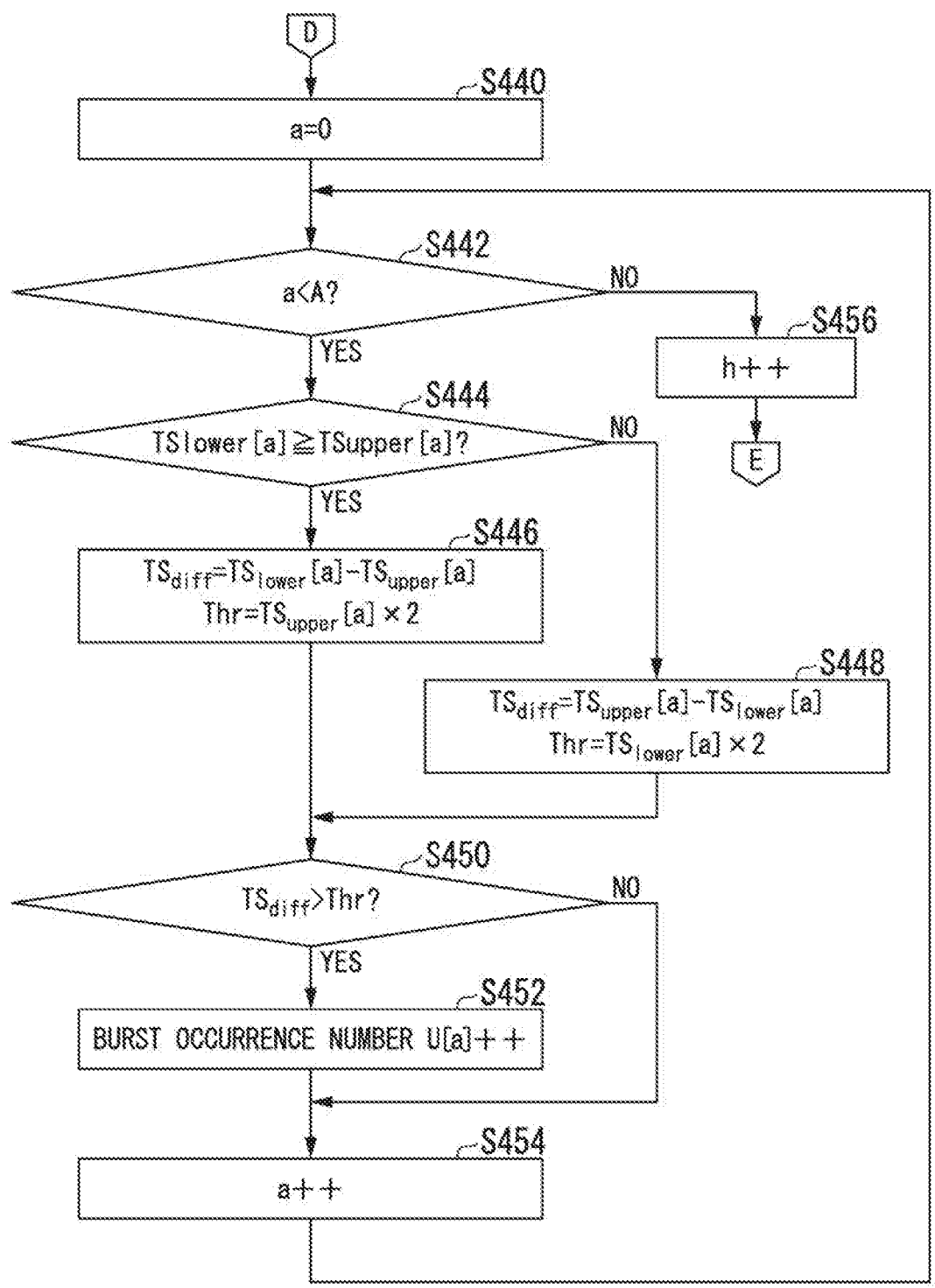
FIG. 17 is a third flowchart showing a process in which the control parameter estimation unit estimates the number of burst frames according to the fourth embodiment.
Figure 18A:
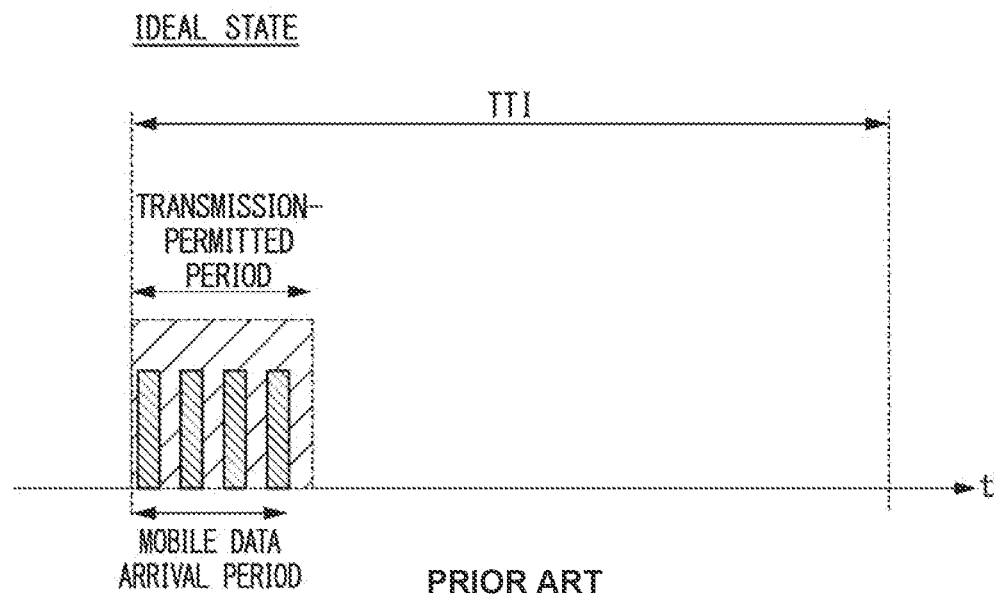
FIG. 18A is a diagram showing a relationship between a transmission-permitted period for an ONU and an arrival period of mobile data according to a prior art.
Figure 18B:
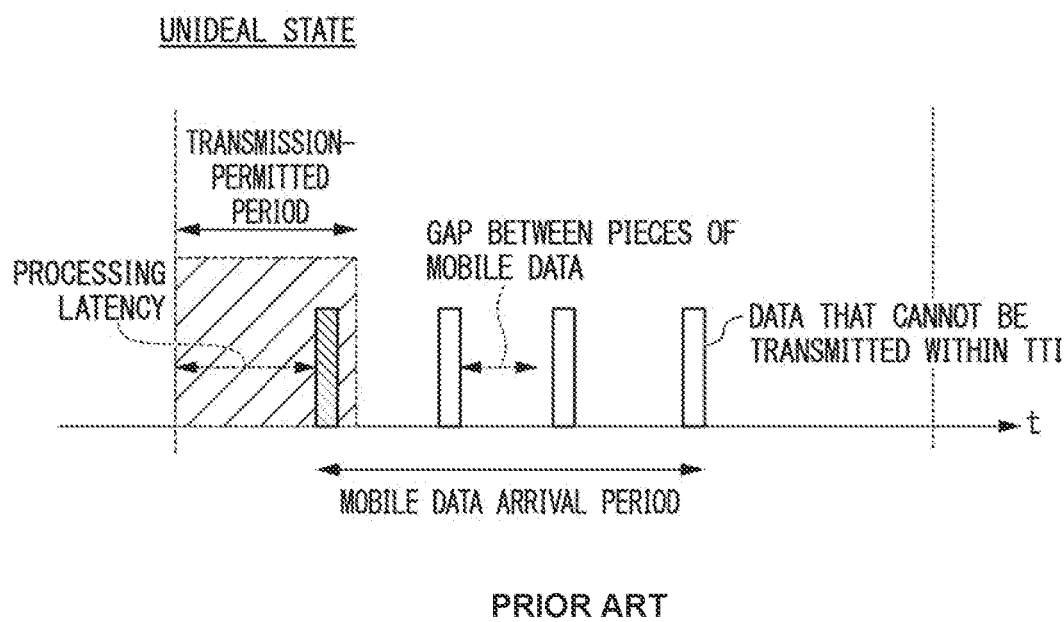
FIG. 18B is a diagram showing a relationship between a transmission-permitted period for an ONU and an arrival period of mobile data according to a prior art.

When a detection number in each allocation cycle is acquired, the control parameter estimation unit 28 estimates the number of burst frames. FIG. 15, FIG. 16, and FIG. 17 are flowcharts showing a process in which the control parameter estimation unit 28 estimates the number of burst frames according to the fourth embodiment. When estimation of the number of burst frames begins, the control parameter estimation unit 28 sets three division points $N_{div}[0]$, $N_{div}[1]$, and $N_{div}[2]$ as shown in Equation (13) (step S412).

[Math. 13]

$$\begin{cases} N_{div}[0] = (M_{recieve}[i] + N_{grant}/4) \bmod N_{grant} \\ N_{div}[1] = (M_{recieve}[i] + N_{grant}/2) \bmod N_{grant} \\ N_{div}[2] = (M_{recieve}[i] + 3 \cdot N_{grant}/4) \bmod N_{grant} \end{cases} \tag{13}$$

The control parameter estimation unit 28 clears each of burst occurrence numbers U[0], U[1], . . . , and U[A] to 0 and sets a variable h indicting a repetition number to 0 (step S414). A indicates a candidate number for the number of burst frames. The control parameter estimation unit 28 determines whether h is greater than or equal to 3 (step S416). When h is smaller than 3 (step S416, NO), the control parameter estimation unit 28 clears detection number counters $TS_{upper}[i]$ and $TS_{lower}[i]$ (i=0, 1, . . . , and A−1) to 0 and set variables a and f to 0 (step S418).

The control parameter estimation unit 28 determines whether a division point $N_{div}[h]$ is smaller than ($N_{grant}/2$) (step S420). When the division point $N_{div}[h]$ is smaller than ($N_{grant}/2$) (step S420, YES), the control parameter estimation unit 28 sets ProbePos indicating an allocation cycle number of an examination target allocation cycle to ($N_{grant}-(N_{grant}/2-N_{div}[h])$) (step S422). When the division point $N_{div}[h]$ is greater than or equal to ($N_{grant}/2$) (step S420, NO), the control parameter estimation unit 28 sets ProbePos to $(N_{div}[h]-N_{grant}/2)$ (step S424).

The control parameter estimation unit 28 determines whether the variable f is smaller than $N_{grant}$ (step S426). When the variable f is smaller than $N_{grant}$ (step S426, YES), the control parameter estimation unit 28 determines whether the variable a is smaller than the candidate number A for the number of burst frames (step S428). When the variable a is smaller than the candidate number A (step S428, YES), the control parameter estimation unit 28 determines whether the variable f is smaller than $(N_{grant}(1-(½^{a+1}))$ (step S430).

When the variable f is smaller than $(N_{grant}(1-(½^{a+1}))$ (step S430, YES), the control parameter estimation unit 28 determines whether the variable f is greater than or equal to $(N_{grant}(1-(½^a))$ (step S431). When the variable f is greater than or equal to $(N_{grant}(1-(½^a))$ (step S431, YES), the control parameter estimation unit 28 adds a detection number R[i][ProbePos] to a detection number counter $TS_{lower}[a]$ (step S432). When the variable f is less than $(N_{grant}(1-(½^a))$ (step S431, NO), the control parameter estimation unit 28 advances the process to step S436.

In step S430, when the variable f is greater than or equal to $(N_{grant}(1-(½^{a+1}))$ (step S430, NO), the control parameter estimation unit 28 adds the detection number R[i][ProbePos] to a detection number counter $TS_{upper}[a]$ (step S434). The control parameter estimation unit 28 increases the variable a by 1 (step S436) and returns the process to step S428.

In step S428, when the variable a is great than or equal to the candidate number A (step S428, NO), the control parameter estimation unit 28 increases the variable f by 1, updates ProbePos as follows, and returns the process to step S426.

ProbePos=(ProbePos+1)mod $N_{grant}$

The control parameter estimation unit 28 divides each allocation cycle into a first half allocation cycle and a second half allocation cycle by repeatedly performing the processing from step S426 to step S436 on each allocation cycle and repeatedly performs a process of calculating the total sum of detection numbers in the first half and second half cycles.

In step S426, when the variable f is greater than or equal to $N_{grant}$ (step S426, NO), the control parameter estimation unit 28 sets the variable a to 0 (step S440) and determines whether the variable a is smaller than the candidate number A (step S442). When the variable a is smaller than the candidate number A (step S442, YES), the control parameter estimation unit 28 determines whether the detection number counter $TS_{lower}[a]$ is greater than or equal to $TS_{upper}[a]$ (step S444).

When $TS_{lower}[a]$ is greater than or equal to $TS_{upper}[a]$ (step S444, YES), the control parameter estimation unit 28 sets $TS_{diff}$ to a difference obtained by subtracting $TS_{upper}[a]$ from $TS_{lower}[a]$. Further, the control parameter estimation unit 28 sets a threshold value Thr to a value obtained by doubling $TS_{upper}[a]$ (step S446).

When $TS_{lower}[a]$ is smaller than $TS_{upper}[a]$ (step S444, NO), the control parameter estimation unit 28 sets $TS_{diff}$ to a difference obtained by subtracting $TS_{lower}[a]$ from $TS_{upper}[a]$. Further, the control parameter estimation unit 28 sets the threshold value Thr to a value obtained by doubling $TS_{lower}[a]$ (step S448).

The control parameter estimation unit 28 determines whether the $TS_{diff}$ calculated in step S446 or step S448 is greater than the threshold value Thr (step S450). When $TS_{diff}$ is smaller than or equal to the threshold value Thr (step S450, NO), the control parameter estimation unit 28 advances the process to step S454. When $TS_{diff}$ is greater than the threshold value Thr (step S450, YES), the control parameter estimation unit 28 increases the burst occurrence number U[a] by 1 (step S452). The control parameter estimation unit 28 increases the variable a by 1 (step S454) and returns the process to step S442.

Upon every division, the control parameter estimation unit 28 determines whether the total sums of detection numbers of a first half allocation cycle and a second half allocation cycle are biased by repeating the processing from step S442 to step S454 and stores determination results in the burst occurrence numbers U[0], U[1], . . . , and U[A].

The threshold value Thr may be a value obtained by multiplying a smaller one of $TS_{lower}[a]$ and $TS_{upper}[a]$ by n (n>1) instead of the value obtained by doubling the smaller one of $TS_{lower}[a]$ and $TS_{upper}[a]$, may be a value obtained by adding a certain value to the smaller one, or may be a predetermined value.

In step S442, when the variable a is greater than or equal to the candidate number A (step S442, NO), the control parameter estimation unit 28 increases the variable h by 1 (step S456) and returns the process to step S416. The control parameter estimation unit 28 changes the division point $N_{div}[h]$ by updating the variable h and repeats the processing from step S418 to step S456.

In step S416, when the variable h is greater than or equal to 3 (step S416, YES), the control parameter estimation unit 28 sets the variable a to 0 (step S458) and determines whether the burst occurrence number U[a] is greater than or equal to 2 (step S460). When the burst occurrence number U[a] is smaller than 2 (step S460, NO), the control parameter estimation unit 28 increases the variable a by 1 (step S462) and keeps increasing the variable a by 1 until the burst occurrence number U[a] becomes greater than or equal to 2. With the processing of step S460 and step S462, the control parameter estimation unit 28 specifies the burst occurrence number U[a] of a case in which a bias is detected two or more times in a determination made at every three division points $N_{div}$. The detection number used in the determination of step S460 is determined according to the number of division points $N_{div}$.

When the burst occurrence number U[a] is greater than or equal to 2 (step S460, YES), the control parameter estimation unit 28 calculates the number of burst frames B $(=2^a)$ on the basis of the variable a (step S464) and finishes estimation of the number of burst frames B. After estimating the number of burst frames B, the control parameter estimation unit 28 calculates the processing latency $T_{latency}$. Calculation of the processing latency $T_{latency}$ is the same as the processing from step S326 to step S330 shown in FIG. 9 according to the third embodiment. In other words, the process of estimating the number of burst frames according to the fourth embodiment is performed between step S324 and step S326 in the processing latency estimation process shown in FIG. 9.

In the flowcharts of FIG. 15, FIG. 16, and FIG. 17 showing the process of estimating the number of burst frames, a process in which three division points are used is shown, but the present invention is not limited to the case. For example, when candidate numbers for the number of burst frames are 1, 2, and C, the control parameter estimation unit 28 may determine whether the number of burst frames is 1 or 2 and then estimate that the number of burst frames is C when the number of burst frames is not any of 1 and 2.

[Operation of Transmission-Permitted Period Start Position Determining Unit 22]

The transmission-permitted period start position determining unit 22 in the fourth embodiment determines a transmission-permitted period start position for an ONU 3 according to a traffic pattern. Specifically, the transmission-permitted period start position determining unit 22 determines a transmission-permitted period start position for each mobile data group (burst data) which arrives at the ONU. 3 in one TI. The transmission-permitted period start position determining unit 22 determines a transmission-permitted period start position on the basis of a mobile data receiving time Time[i] acquired from the cooperative processing unit 21 and the number of burst frames B. A transmission-permitted period start position for an $i^{th}$ ONU 3 is determined by Equation (14).

[Math. 14]

$$\text{Time}[i]+T_{latency}+(b-1)\cdot(N_{grant}/B)\cdot T_{period}, b= 1,2,\ldots,B \quad (14)$$

For example, when the number of burst frames is 2, the transmission-permitted period start position determining unit 22 determines (Time[i]+$T_{latency}$) and (Time[i]+$T_{latency}$+($N_{grant}$/2)$T_{period}$ to be a transmission-permitted period start position.

[Operation of Transmission-Permitted Period Length Determining Unit 23]

The transmission-permitted period length determining unit 23 in the fourth embodiment determines the number of allocation cycles required for transmission of respective pieces of burst data as a transmission-permitted period length for the ONU 3. The transmission-permitted period length determining unit 23 notifies the number of allocation cycles corresponding to the number of burst frames B to the allocation amount calculation unit 24. The allocation cycle number $N_{cycle,burst}[i]$ is determined by Equation (15).

[Math. 15]

$$N_{cycle,burst}[i] = \min\left(N_{grant}, \left\lceil \frac{DataSize[i]/B}{D_{min}} \right\rceil\right) \quad (15)$$

Operation in which the control parameter estimation unit 28 estimates the number of burst frames B before estimation of the processing latency $T_{latency}$ has been described, but the present invention is not limited thereto. For example, the control parameter estimation unit 28 may estimate the number of burst frames after temporarily estimating the processing latency $T_{latency}$ and estimate the processing latency $T_{latency}$ again on the basis of the estimated number of burst frames. In this case, the control parameter estimation unit 28 needs not to make a determination on each of a first half allocation cycle and a second half allocation cycle by using a plurality of division points $N_{div}$ and may estimate the processing latency $T_{latency}$ by using one division point $N_{div}$.

In the OLT of the fourth embodiment, the control parameter estimation unit 28 estimates the number of burst frames, and the transmission-permitted period start position determining unit 22 and the transmission-permitted period length determining unit 23 determine a transmission-permitted period start position and a transmission-permitted period length on the basis of the number of burst frames. Due to these operations, the OLT can accurately determine a transmission-permitted period including an entire mobile data arrival period even when an ONU 3 divides mobile data into a plurality of pieces of burst data and transmits the plurality of pieces of burst data.

According to the above-described embodiments, even when there is a processing latency in a lower device, a gap between pieces of mobile data, and a fluctuation of the gap, a transmission-permitted period is adjusted, and an allocation amount corresponding to the adjusted transmission-permitted period is determined and reported, so that the entire arrival period of the corresponding mobile data may be included in the transmission-permitted period. In this way, it is possible to reduce the amount of mobile data that cannot be transmitted from an ONU in one TTI. Also, since the allocation amount is sequentially determined according to a mobile data amount of each lower device, an excessive bandwidth is not allocated to each ONU, and the delay is not increased.

According to the above-described embodiments, a communication system includes terminal station device and terminal device and relays upstream data, which is received from a communication terminal by a lower device connected to the terminal device, to an upper device connected to the terminal station device. A bandwidth allocation device allocates a transmission bandwidth of the upstream data to the terminal device. The bandwidth allocation device may be the same device as the terminal station device. The bandwidth allocation device is, for example, the OLTs 2, 2a, and 2b. The bandwidth allocation device includes a transmission-permitted period start position determining unit, a transmission-permitted period length determining unit, and a bandwidth allocation unit. The transmission-permitted period start position determining unit estimates a start position of an arrival period in which the upstream data arrives at the terminal device from the lower device. The transmission-permitted period length determining unit estimates a length of the arrival period on the basis of a data amount of upstream data that can be transmitted from the lower device to the terminal device. The length of the arrival period is a transmission-permitted period length in the terminal station device. The bandwidth allocation unit allocates a bandwidth to the terminal device on the basis of the estimated start position and the estimated length of the arrival period. The bandwidth allocation unit is, for example, the allocation amount calculation unit 24.

The bandwidth allocation device may further include a cooperative processing unit which acquires radio resource information, which is information on radio resources allocated to the communication terminal for wireless communication with the lower device, from the upper device and calculates an arrival start time where the upstream data begins to arrive at the lower device on the basis of the acquired radio resource information. The transmission-permitted period start position determining unit determines a time obtained by adding at least a time spent for internal processing in the lower device to the arrival start time as an estimated time of the start position of the arrival period.

Alternatively, the bandwidth allocation device may further include a traffic monitoring unit which monitors the traffic amount of upstream data received from each terminal device at the terminal station device. The transmission-permitted period start position determining unit detects a time at which the amount of upstream user data received from the terminal device begins to exceed a threshold value in each autonomous interval having the same length as a transmission time interval of the upstream data from the lower device to the upper device and treats a time obtained by adding a time difference between a start time of the autonomous interval and the detected time in the autonomous interval at the terminal station device as an estimated time of the start position of the arrival period.

Also, the transmission-permitted period length determining unit treats a value obtained by multiplying a length of a predetermined period (e.g., allocation cycles) and a value obtained by dividing the amount of upstream data that can be transmitted from the lower device by a minimum arrival amount, which is a minimum arrivable amount of upstream data from the lower device in the aforementioned predetermined period, as an estimated value of the length of the arrival period. The minimum arrival amount is a value obtained by multiplying the amount of data that can be transmitted in an arrival period of the maximum length and a value obtained by dividing a length of a predetermined period (e.g., an allocation cycle length) by the maximum length of an arrival period.

Also, when a value obtained by multiplying the length of the predetermined period and a value obtained by dividing the amount of upstream data that can be transmitted from the lower device by the minimum arrival amount exceeds a length of a transmission time interval of the upstream data from the lower device to the upper device, the transmission-permitted period length determining unit treats the length of the transmission time interval as the estimated value of the arrival period.

Also, the bandwidth allocation unit may equally distribute a bandwidth available in a period in which at least one terminal device has an arrival period to the terminal devices having the arrival period in the period and equally distribute an entire bandwidth available in a period in which any terminal device does not have an arrival period to all of the terminal devices in the period.

Some functions of the OLTs 2, 2a, and 2b in the above-described embodiments may be implemented by a computer. In this case, a program for implementing the functions may be recorded in a computer-readable recording medium and may be implemented by causing a computer system to read and execute the program recorded in the recording medium. The "computer system" referred to here is considered to include an operating system (OS) and hardware such as peripheral devices. Also, the "computer-readable recording medium" refers to a portable medium, such as a flexible disk, a magneto-optical disk, a read-only memory (ROM), and a compact disk read-only memory (CD-ROM), and a storage device, such as a hard disk incorporated in a computer system. Further, the "computer-readable recording medium" may include a network, such as the Internet, a communication line, such as a telephone line, and the like which dynamically hold a program for a short period, and a volatile memory inside a computer system which serves as a server or a client in such a case and holds a program for a certain period. The aforementioned program may be intended to implement some of the above-described functions and may be able to implement the above-described functions in combination with a program which has been already recorded in a computer system.

Although the embodiments of the present invention have been described in detail above with reference to the drawings, the present invention is not limited to the above embodiments. Various changes understood by those of ordinary skill in the art can be made to configurations and details of the present invention within the scope of the present invention. Also, it is possible to implement the respective embodiments in arbitrary combination within a consistent range.

INDUSTRIAL APPLICABILITY

The present invention can be used in a system that performs communication in a time-division duplex manner.

REFERENCE SIGNS LIST 100, 101, 102 Communication system
1 Upper device
2, 2a, 2b OLT
3 ONU
4 Lower device
21 Cooperative processing unit
22, 22a Transmission-permitted period start position determining unit
23 Transmission-permitted period length determining unit
24 Allocation amount calculation unit
25 Transceiver unit
26 Traffic monitoring unit
27 Statistical processing unit
28 Control parameter estimation unit

The invention claimed is:

1. A bandwidth allocation device which allocates a bandwidth to at least one terminal device in a communication system including a terminal station device and the at least one terminal device and relaying upstream data, which is received from a communication terminal by a lower device connected to the at least one terminal device, to an upper device connected to the terminal station device, the bandwidth allocation device comprising:
at least one memory configured to store instructions; and
at least one processor configured to execute the instructions to:
estimate a start position of an arrival period in which the upstream data arrives at the at least one terminal device from the lower device;
estimate a length of the arrival period on a basis of an amount of upstream data to be transmitted from the lower device to the at least one terminal device; and
allocate a bandwidth to the at least one terminal device on a basis of the estimated start position and the estimated length of the arrival period,
wherein the at least one processor is further configured to execute the instructions to acquire radio resource information indicating radio resources allocated to the communication terminal for wireless communication with the lower device from the upper device and calculate an arrival start time where the upstream data begins to arrive at the lower device on the basis of the radio resource information, and
wherein the at least one processor is configured to execute the instructions to treat a time obtained by adding at least a time spent for internal processing in the lower device to the arrival start time as an estimated time of the start position.

2. The bandwidth allocation device according to claim 1, wherein the at least one processor is further configured to execute the instructions to monitor a traffic amount of upstream data received from the at least one terminal device at the terminal station device, and
the at least one processor is configured to execute the instructions to detect a time at which an amount of upstream user data received from the at least terminal device begins to exceed a threshold value in each autonomous interval having a same length as a transmission time interval of the upstream data from the lower device to the upper device, and treat a time obtained by adding a time difference between a start time in the autonomous interval and the detected time in the autonomous interval to the start time in each autonomous interval at the terminal station device as an estimated time of the start position.

3. The bandwidth allocation device according to claim 1, wherein the at least one processor is configured to execute the instructions to treat a value obtained by multiplying a predetermined length of the period and a value obtained by dividing the amount of upstream data to be transmitted from the lower device by a minimum arrival amount, which is a minimum arrivable amount of upstream data from the lower device in a predetermined period, as an estimated value of the length of the arrival period.

4. The bandwidth allocation device according to claim 3, wherein the at least one processor is configured to execute the instructions to treat a value obtained by multiplying a value obtained by dividing the predetermined length of the period by a maximum length of the arrival period and an transmittable amount of upstream data in the maximum length of the arrival period as the minimum arrival amount.

5. The bandwidth allocation device according to claim 3, wherein the at least one processor is configured to execute the instructions to treat, when a value obtained by multiplying the predetermined length of the period and a value obtained by dividing an amount of upstream data to be transmitted from the lower device by the minimum arrival amount exceeds a length of a transmission time interval of the upstream data from the lower device to the upper device, the length of the transmission time interval as the estimated value of the arrival period.

6. The bandwidth allocation device according to claim 1, wherein the at least one processor is configured to execute the instructions to equally distribute a bandwidth available in a period in which the at least one terminal device has the arrival period to the at least one terminal device having the arrival period in the period and equally distribute a bandwidth available in a period in which any of the at least one terminal device does not have the arrival period to all of the at least one terminal device in the period.

7. The bandwidth allocation device according to claim 1, wherein the at least one processor is further configured to execute the instructions to determine whether the at least one terminal device has upstream data to be transmitted to the upper device at each allocation cycle obtained by dividing a transmission time interval of the upstream data from the lower device to the upper device and estimate a processing latency in the lower device on a basis of a start time of an allocation cycle in which it is determined a largest number of times that upstream data to be transmitted to the upper device is present and a time at which the lower device receives the upstream data from the communication terminal, and the at least one processor is configured to execute the instructions to calculate an estimated time of the start position on a basis of the estimated processing latency and the time at which the lower device receives the upstream data from the communication terminal.

8. The bandwidth allocation device according to claim 7, wherein the at least one processor is configured to execute the instructions to:

recursively divide allocation cycles in the transmission time interval into a first half allocation cycle and a second half allocation cycle, estimate a number of burst frames of the upstream data on a basis of a number of times of division of the transmission time interval performed until a certain difference or more is detected between an amount of upstream data transmitted in the first half allocation cycle and an amount of upstream data transmitted in the second half allocation cycle, and calculate an estimated time of the start position on a basis of the processing latency and the estimated number of burst frames and the time at which the lower device receives the upstream data from the communication terminal.

9. The bandwidth allocation device according to claim 1, wherein the at least one processor is further configured to execute the instructions to acquire an amount of upstream data to be transmitted to the upper device from the at least one terminal device at each allocation cycle obtained by dividing a transmission time interval of the upstream data from the lower device to the upper device and estimate a minimum arrival amount, which is a minimum amount of upstream data to be arrived at the at least one terminal device in an allocation cycle, on a basis of a difference in an amount of upstream data between allocation cycles, and the at least one processor is configured to execute the instructions to treat a value obtained by multiplying a length of an allocation cycle and a value obtained by dividing an amount of upstream data transmitted from the lower device to the at least one terminal device by the minimum arrival amount as an estimated value of the length of the arrival period.

10. A bandwidth allocation method executed by a bandwidth allocation device which allocates a bandwidth to at least one terminal device in a communication system including a terminal station device and the at least one terminal device and relaying upstream data, which is received from a communication terminal by a lower device connected to the at least one terminal device, to an upper device connected to the terminal station device, the bandwidth allocation method comprising:

estimating a start position of an arrival period in which the upstream data arrives at the at least one terminal device from the lower device;

estimating a length of the arrival period on a basis of an amount of upstream data to be transmitted from the lower device to the at least one terminal device; and allocating a bandwidth to the at least one terminal device on a basis of the estimated start position and the estimated length of the arrival period, wherein the bandwidth allocation method further comprises:

acquiring radio resource information indicating radio resources allocated to the communication terminal for wireless communication with the lower device from the upper device and calculating an arrival start time where the upstream data begins to arrive at the lower device on a basis of the radio resource information, and in the estimating of the start position of the arrival period, a time obtained by adding at least a time spent for internal processing in the lower device to the arrival start time is treated as an estimated time of the start position.

* * * * *